(12) United States Patent
Okuma et al.

(10) Patent No.: US 12,113,940 B2
(45) Date of Patent: Oct. 8, 2024

(54) INFORMATION PROCESSING APPARATUS, CONTROL METHOD THEREFOR, AND STORAGE MEDIUM

(71) Applicant: CANON KABUSHIKI KAISHA, Tokyo (JP)

(72) Inventors: Satoshi Okuma, Ibaraki (JP); Kiichi Hasegawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/190,829

(22) Filed: Mar. 27, 2023

(65) Prior Publication Data

US 2023/0319194 A1 Oct. 5, 2023

(30) Foreign Application Priority Data

Apr. 4, 2022 (JP) ................................ 2022-062382

(51) Int. Cl.
*H04N 1/00* (2006.01)
*G06F 3/12* (2006.01)

(52) U.S. Cl.
CPC ......... *H04N 1/00079* (2013.01); *G06F 3/121* (2013.01); *G06F 3/1239* (2013.01)

(58) Field of Classification Search
None
See application file for complete search history.

(56) References Cited

U.S. PATENT DOCUMENTS

| 10,652,178 B2 * | 5/2020 | Takishima | G06F 3/1287 |
| 11,487,482 B2 * | 11/2022 | Kurokawa | G06F 3/1238 |
| 11,500,596 B2 * | 11/2022 | Ogawa | G06Q 10/087 |
| 11,671,391 B2 * | 6/2023 | Makino | H04L 51/046 |
| | | | 709/206 |
| 11,774,894 B2 * | 10/2023 | Suzuki | G03G 15/556 |
| | | | 399/25 |
| 2010/0185665 A1 * | 7/2010 | Horn | H04L 51/18 |
| | | | 707/769 |
| 2018/0272733 A1 * | 9/2018 | Moriya | B41J 2/17533 |
| 2019/0235815 A1 * | 8/2019 | Takagi | G06F 21/1078 |
| 2019/0258431 A1 * | 8/2019 | Yamamoto | H04L 67/025 |

(Continued)

FOREIGN PATENT DOCUMENTS

| JP | 2015164050 A | 9/2015 |
| JP | 2018128843 A | 8/2018 |
| JP | 2021096832 A | 6/2021 |

*Primary Examiner* — Helen Zong
(74) *Attorney, Agent, or Firm* — Canon U.S.A., Inc. IP Division

(57) ABSTRACT

An information processing apparatus connected to an image processing apparatus and a message communication service via a network includes a transmission unit configured to perform transmission based on data received from the image processing apparatus in such a way as to post a notification concerning the received data on a message communication space of the message communication service in which a user registered while being associated with the image processing apparatus is participating, and an execution unit configured to, in a case where the information processing apparatus has received, from the message communication service, data transmitted as a response from the user to the message communication space after the notification is posted, execute processing that is based on the data transmitted as a response.

15 Claims, 28 Drawing Sheets

(56) References Cited

U.S. PATENT DOCUMENTS

| | | | |
|---|---|---|---|
| 2020/0096928 A1* | 3/2020 | Moriya | G03G 15/5079 |
| 2020/0304446 A1* | 9/2020 | Sasamae | H04L 51/216 |
| 2020/0344375 A1* | 10/2020 | Ishii | G06F 3/1268 |
| 2021/0191673 A1* | 6/2021 | Ogawa | G06F 3/1229 |
| 2022/0166889 A1* | 5/2022 | Yoshida | G03G 15/502 |
| 2023/0188655 A1* | 6/2023 | Miyadome | H04N 1/32635 |
| | | | 358/1.14 |
| 2023/0259312 A1* | 8/2023 | Nakamura | G06F 3/1231 |
| | | | 358/1.15 |
| 2023/0342545 A1* | 10/2023 | Mahindru | G06F 40/211 |

* cited by examiner

FIG.9

| PRINTER | ADMINISTRATOR | CHAT ROOM ID | ORDERING MODE SETTING | ... |
|---|---|---|---|---|
| PRINTER A | USER A | AAA-AAA-AAA | VIA MFP | |
| PRINTER B | USER B | BBB-BBB-BBB | VIA FUNCTION EXTENSION PLATFORM SERVER | |

| PRINTER | CONSUMABLE AUTOMATIC ORDERING CONTRACT INFORMATION | AUTOMATIC ORDERING MODE |
|---|---|---|
| PRINTER A | PRESENCE OF CONTRACT | AUTOMATIC ORDERING NOT TO BE PERFORMED |
| PRINTER B | PRESENCE OF CONTRACT | AUTOMATIC ORDERING TO BE PERFORMED |
| ... | | |ാ
| 901 | 902 | 903 |

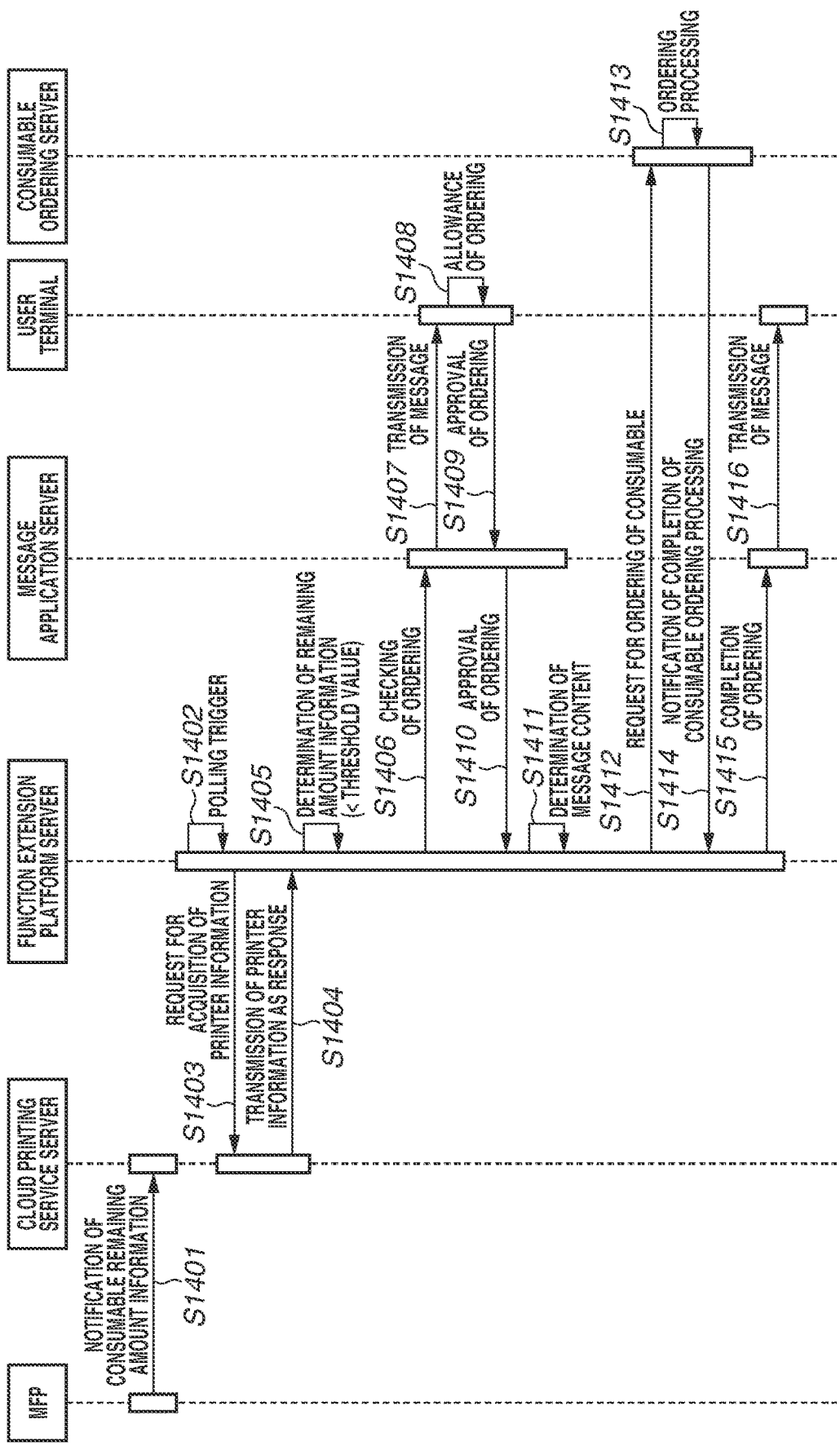

FIG.22A

| ERROR ID | MESSAGE ID | OPTION ID |
|---|---|---|
| E001-0010 | M001, M002, M003, M004 | S001, S002, S003, S004 |
| E002-0001 | M001, M005, M003, M004 | S001, S002, S003, S004 |
| E003-0001 | M001, M002, M003, M004 | S001, S002, S003, S004, S005 |
| ... | ... | ... |

FIG.22B

| MESSAGE ID | MESSAGE SENTENCE | DISPLAY CLASSIFICATION |
|---|---|---|
| M001 | A service error has occurred. | GENERAL / ADMINISTRATOR |
| M002 | This is not currently available. | GENERAL |
| M003 | [error ID] | ADMINISTRATOR |
| M004 | Please select a coping method. | ADMINISTRATOR |
| M005 | The print function is not currently available. | GENERAL |
| M006 | The scan function is not currently available. | GENERAL |
| ... | ... | ... |

FIG.22C

| OPTION ID | OPTION SENTENCE | PROCESSING | ADDITIONAL DATA |
|---|---|---|---|
| S001 | Telephone to a service. | CallTelephone(#1) | "0120-xxx-xxx" |
| S002 | Reserve a service. | OpenURL(#1) | "http://copy_service.com/reserve?reason=[error ID]" |
| S003 | Display details. | OpenURL(#1) | "http://copy_service.com/error_detail?error_id=[error ID]" |
| S004 | Perform coping later. | ChatLater(#1) | "60min" |

INFORMATION PROCESSING APPARATUS, CONTROL METHOD THEREFOR, AND STORAGE MEDIUM

BACKGROUND

Field

Aspects of the present disclosure generally relate to an information processing apparatus, a control method therefor, and a storage medium each of which is adapted to manage an image processing apparatus existing on a network utilizing a message communication service such as a chat service.

Description of the Related Art

With the spread of cloud computing, data or a service being manipulated on cloud computing has been becoming general, so that the user has become able to edit the data or receive the service without depending on a client terminal. Cloud computing includes various services and applications, in which there exist a business chat, which is a message communication service, such as Microsoft Teams®, and applications similar to the business chat. Such applications allow users to create a place (group) in which users gather messages, tools, and files together and share them with a team and to exchange them. Additionally, the business chat is able to cooperate with another cloud service or application, and there also exists, for example, a service which makes a reply in an interactive format with respect to an input (hereinafter referred to as a "bot").

On the other hand, along with the popularization of cloud services, a technique in which a multifunction peripheral also includes a network communication function and causes an image processing apparatus and a business chat to cooperate with each other has been proposed. Japanese Patent Application Laid-Open No. 2018-128843 discusses a technique of using a business chat service, which is a cloud service, instead of an operation unit included in an image forming apparatus.

Moreover, there is a technique in which an image processing apparatus itself detects the remaining amount of consumables such as toner or ink having becomes low and places an order for such consumables. Japanese Patent Application Laid-Open No. 2021-96832 discusses a technique of acquiring information about the remaining amount of consumables from a plurality of image output apparatuses and placing an order for new consumables.

Additionally, there is a technique in which an image processing apparatus itself detects a failure or trouble of hardware or software of the image forming apparatus and issues a notification of such a failure or trouble. Japanese Patent Application Laid-Open No. 2015-164050 discusses a technique of detecting an error concerning print job execution of an image processing apparatus and notifying a remote device such as a personal computer (PC) of the detected error.

In the above-mentioned techniques, an image processing apparatus (image forming apparatus) necessarily places an order for consumables at timing when it has been determined that the remaining amount of consumables has become low. Therefore, there is an issue in which, even in a case where, for any reason, the user does not require consumables, the image processing apparatus may place an order for consumables. As a way to avoid this issue, there is a method of, at timing when it has been determined that the remaining amount of consumables has become low, sending e-mail to the user and asking the user for confirmation as to place an order. However, e-mail is low in instantaneity as compared with a business chat, and is also large in the number of steps required for the user.

Moreover, while, in a case where a failure or trouble has occurred in an image processing apparatus (image forming apparatus), a notification of an error is issued, processing operations for, for example, examining the detailed content of such an error or finding out a request destination to which to make a repair request have to be performed by the user himself or herself each time. Therefore, the user is required to perform complicated processing each time a notification of an error is issued, and may take much time to cope with the error.

SUMMARY

According to an aspect of the present disclosure, an information processing apparatus connected to an image processing apparatus and a message communication service via a network includes a transmission unit configured to perform transmission based on data received from the image processing apparatus in such a way as to post a notification concerning the received data on a message communication space of the message communication service in which a user registered while being associated with the image processing apparatus is participating, and an execution unit configured to, in a case where the information processing apparatus has received, from the message communication service, data transmitted as a response from the user to the message communication space after the notification is posted, execute processing that is based on the data transmitted as a response.

Further features of the present disclosure will become apparent from the following description of exemplary embodiments with reference to the attached drawings.

BRIEF DESCRIPTION OF THE DRAWINGS

FIG. 9 is a diagram illustrating an example of a printer function information table.

FIG. 10 is a diagram illustrating an example of a consumable automatic ordering contract information table.

FIG. 15 is a sequence diagram illustrating a sequence for notifying the consumable ordering server of an order placement for a consumable.

FIGS. 22A, 22B, and 22C are diagrams illustrating examples of data which a function extension platform server in the second exemplary embodiment retains.

DESCRIPTION OF THE EMBODIMENTS

Various exemplary embodiments, features, and aspects of the disclosure will be described in detail below with reference to the drawings. However, constituent elements described in these exemplary embodiments are merely illustrated as examples, and the scope of the present disclosure should not be construed to be limited to only such constituent elements.

<Overall Configuration of Management System>

Figure 1:
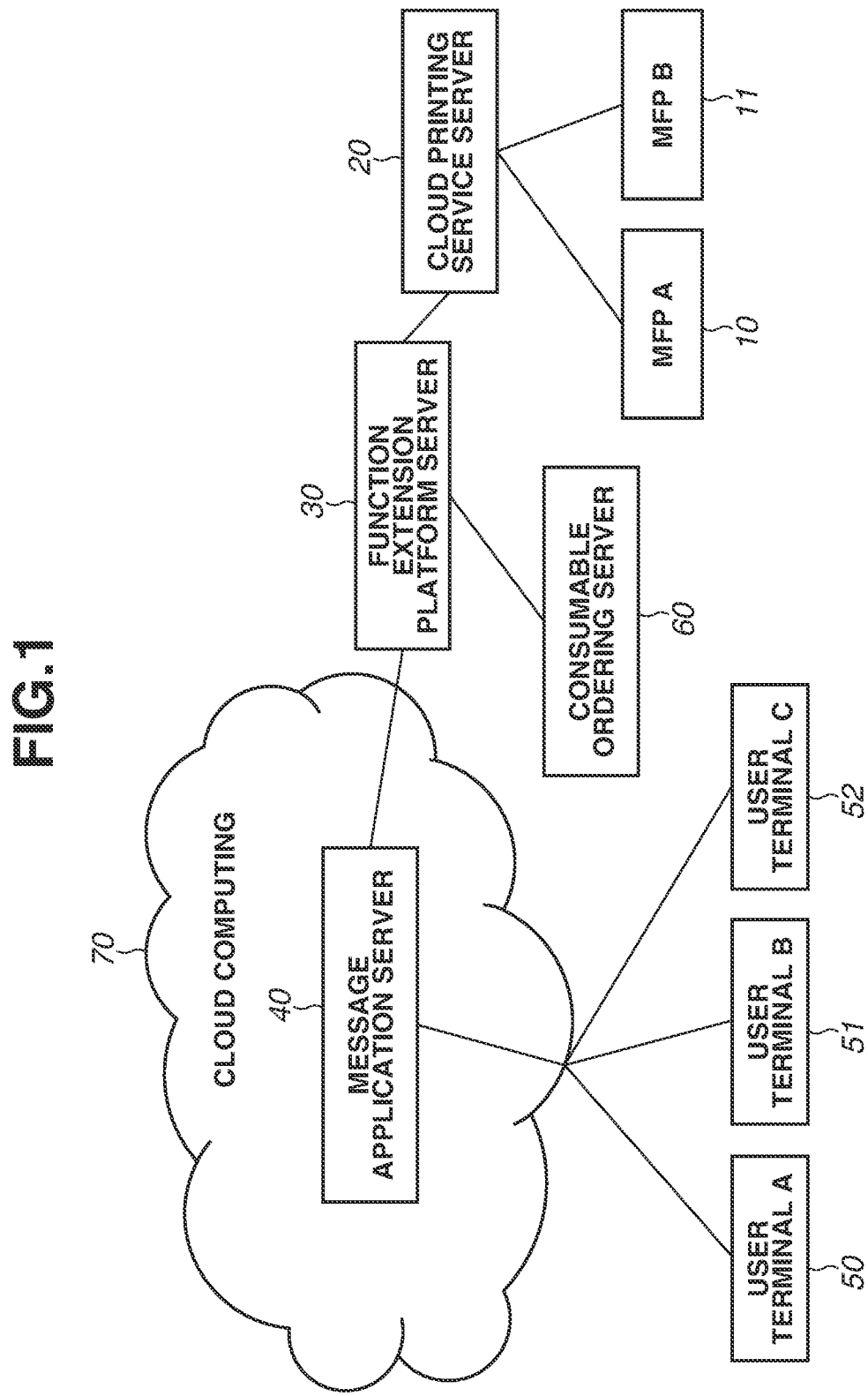
FIG. 1 is a diagram illustrating an example of a management system configuration according to a first exemplary embodiment of the present disclosure.

FIG. 1 is a diagram illustrating an example of an overall configuration of a management system in a first exemplary embodiment of the present disclosure. The management system includes multifunction peripherals (MFPs) 10 and 11, each serving as an image processing apparatus, and user terminals 50 to 52, which are connected to a plurality of servers via a network in such a way as to be able to communicate with each other. The connected plurality of servers, each serving as an information processing apparatus, includes a cloud printing service server 20, a function extension platform server 30, a message application server 40 included in cloud computing 70, and a consumable ordering server 60.

Each of the MFPs 10 and 11 is an image forming apparatus including a function of executing a print job input by the user and communicated via the cloud printing service server 20 (printing function) or a function of notifying the cloud printing service server 20 of an image obtained by performing reading. While, in FIG. 1, two MFPs 10 and 11 each serving as an image processing apparatus are connected, the number of connected apparatuses is optional. The MFPs 10 and 11 have the same configuration, so that, in the subsequent description, the MFP 10 serving as an image processing apparatus is described as a representative.

The cloud printing service server 20 is a server which performs a control operation of notifying the MFP 10 of job data communicated from the cloud computing 70 or a control operation of notifying the cloud computing 70 of an event or data communicated from the MFP 10.

The function extension platform server 30 is a server which controls the MFP 10 via the cloud printing service server 20 and also controls the message application server 40. A function extension platform mounted in the function extension platform server 30 performs a control operation of notifying the MFP 10 of image data stored in the message application server 40 and a control operation of notifying the consumable ordering server 60 of an order placement for a consumable directed to the MFP 10.

Figure 5:
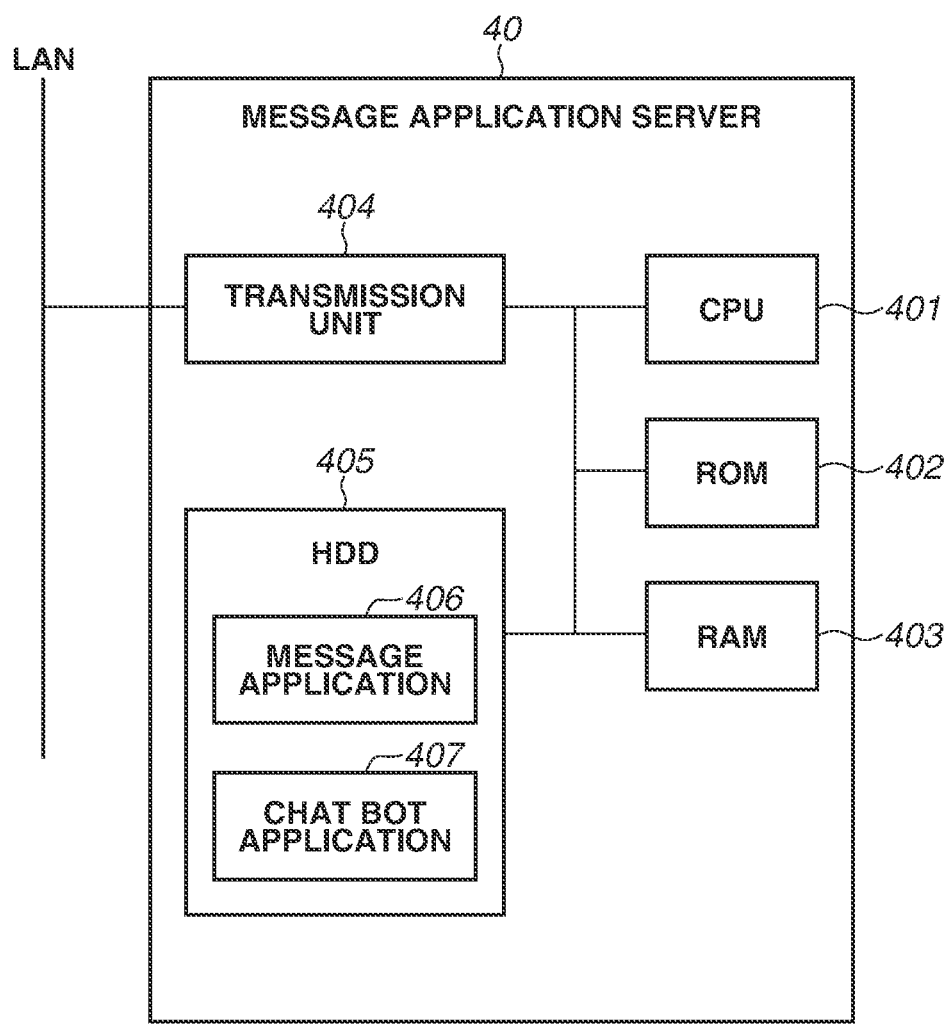
FIG. 5 is a diagram illustrating an example of a hardware configuration of a message application server.

The message application server 40 is a cloud server arranged on the cloud computing 70 and is a server which provides a message communication service using a message application 406 (FIG. 5). The message application server 40 performs comprehensive processing operations concerning exchange of messages, such as transmission and reception processing of, for example, messages for the user terminals 50 to 52 and displaying of display screens for message transmission and reception.

Each of the user terminals 50 to 52 is an information terminal, such as a smartphone, a tablet terminal, or a personal computer which the user of a message application service uses. While, in FIG. 1, three user terminals 50 to 52 each serving as an information terminal are connected, the number of connected terminals is optional. The user operates an applicable user terminal to access the message application server 40 on the cloud computing 70 via a network, and performs exchange of messages with another user and performs execution of an installed application. The user terminals 50 to 52 can be configured to have the same configuration, so that, in the subsequent description, the user terminal 50 is described as a representative.

The consumable ordering server 60 is a server which performs ordering processing for a consumable to be mounted in the MFP 10 serving as an image processing apparatus. In the present configuration, a request for the ordering processing is made via the function extension platform server 30.

<Hardware Configuration of MFP>

Figure 2:
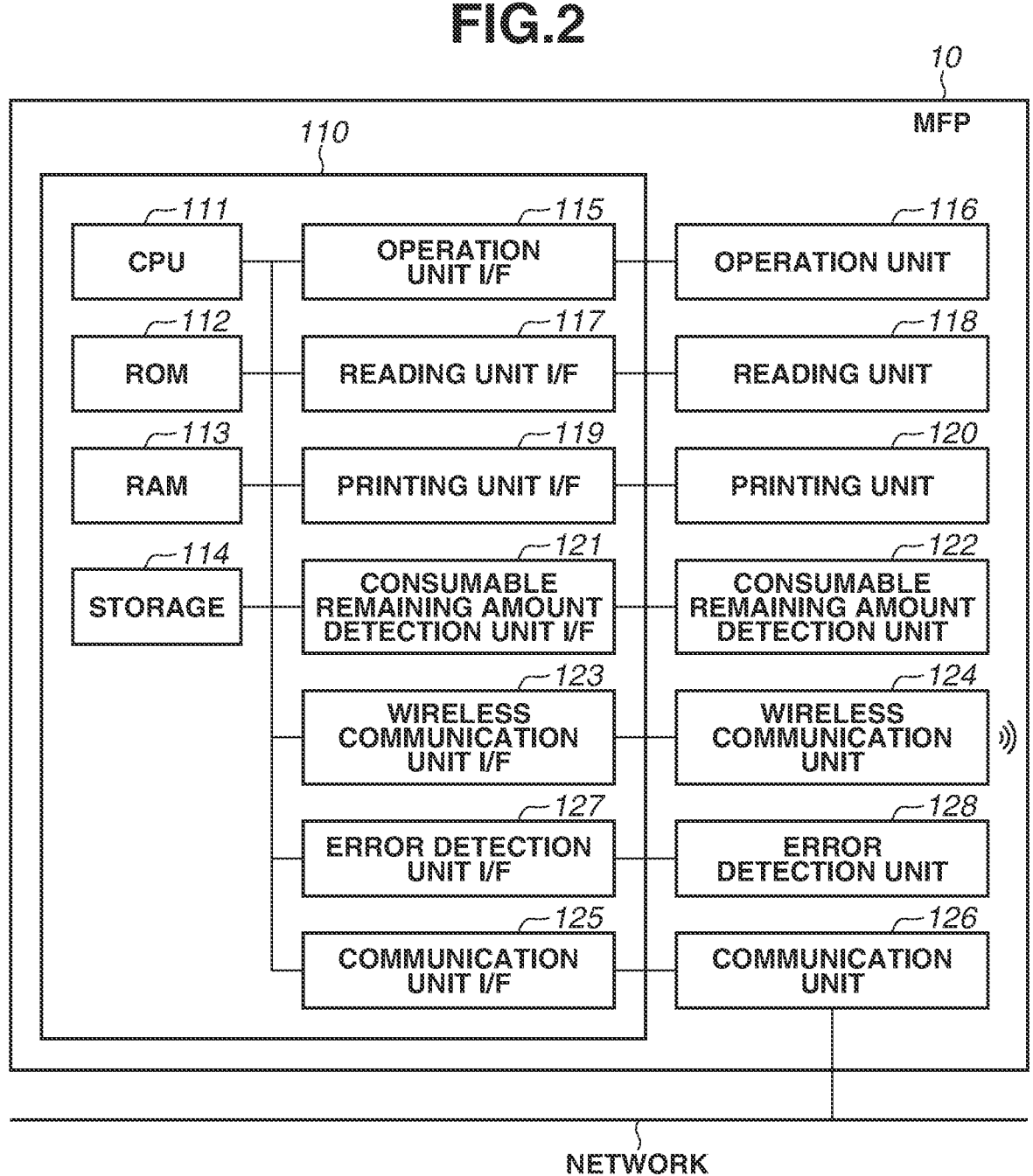
FIG. 2 is a diagram illustrating an example of a hardware configuration of a multifunction peripheral (MFP).

FIG. 2 is a diagram illustrating an example of a hardware configuration of the MFP 10. The MFP 10 includes a control unit 110. The control unit 110 includes a central processing unit (CPU) 111, a read-only memory (ROM) 112, a random access memory (RAM) 113, a storage 114, an operation unit interface (I/F) 115, a reading unit I/F 117, a printing unit I/F 119, a consumable remaining amount detection unit I/F 121, a wireless communication unit I/F 123, a communication unit I/F 125, and an error detection unit I/F 127. The operation unit I/F 115 is connected to an operation unit 116, the reading unit I/F 117 is connected to a reading unit 118, and the printing unit I/F 119 is connected to a printing unit 120. Moreover, the consumable remaining amount detection unit I/F 121 is connected to a consumable remaining amount detection unit 122, the wireless communication unit I/F 123 is connected to a wireless communication unit 124, the communication unit I/F 125 is connected to a communication unit 126, and the error detection unit I/F 127 is connected to an error detection unit 128.

The control unit 110, which includes the CPU 111, controls operations of the entire MFP 10. The CPU 111 loads a control program stored in the ROM 112 or the storage 114 onto the RAM 113 and thus performs various control operations such as reading control and printing control.

The ROM 112 stores control programs, which are executable by the CPU 111. Moreover, the ROM 112 also stores, for example, a boot program and font data.

The RAM 113 is a main storage memory and is used as a temporary storage region onto which to load various control programs stored in the ROM 112 and the storage 114.

The storage 114 stores image data, print data, various programs, various addresses, and various pieces of setting information including automatic ordering setting. Examples of a candidate for a medium which is used as the storage 114 include a flash memory, an auxiliary storage device such as an SSD or an HDD, and an eMMC. Here, SSD is an abbreviation for solid state drive, HDD is an abbreviation for hard disk drive, and eMMC is an abbreviation for embedded MultiMediaCard.

Furthermore, while, in the MFP 10 in the present exemplary embodiment, one CPU 111 is assumed to use one RAM 113 to perform processing operations in flowcharts described below, the present exemplary embodiment is not limited to this. For example, a plurality of CPUs, a plurality of RAMs, a plurality of ROMs, and a plurality of storages can be configured to cooperate with each other to perform various processing operations. Moreover, a hardware circuit such as an application specific integrated circuit (ASIC) or a field-programmable gate array (FPGA) can be used to perform some processing operations.

The operation unit I/F 115 interconnects the operation unit 116, which includes a display unit such as a touch panel and hardware keys, and the control unit 110. The operation unit 116 displays information to the user and detects an input from the user.

The reading unit I/F 117 interconnects the reading unit 118, such as a scanner, and the control unit 110. The reading unit 118 reads an image of an original, and the CPU 111 converts the read image into image data such as binary data. Image data generated based on an image read by the reading unit 118 is transmitted to an external apparatus or is printed on a recording sheet.

The printing unit I/F 119 interconnects the printing unit 120, such as a printer, and the control unit 110. The CPU 111 transfers image data stored in the RAM 113 (print data) to the printing unit 120 via the printing unit I/F 119. The printing unit 120 prints an image that is based on the transferred image data on a recording sheet fed from a paper feed cassette.

The consumable remaining amount detection unit I/F 121 is an I/F for controlling the consumable remaining amount detection unit 122. The consumable remaining amount detection unit 122 detects the remaining amount of a consumable, such as developer, which is used in the MFP 10, and performs notification of the detected remaining amount to the CPU 111 or another apparatus existing on the network via the consumable remaining amount detection unit I/F 121.

The wireless communication unit I/F 123 is an I/F for controlling the wireless communication unit 124, and interconnects the control unit 110 and an external wireless apparatus via wireless. A configuration in which the user terminals 50 to 52 are used as another wireless apparatus can be employed.

The communication unit 126 interconnects the control unit 110 and the network. The communication unit I/F 125 controls the communication unit 126 to transmit image data or various pieces of information about the inside of the MFP 10 to an external apparatus existing on the network or to receive print data or information existing on the network from an information processing apparatus existing on the network. The method of transmission and reception via the network can include transmission and reception using electronic mail (e-mail) and file transmission using another protocol (for example, the File Transfer Protocol (FTP), Server Message Block (SMB), or Web Distributed Authoring and Versioning (WebDAV)). Additionally, access by HyperText Transfer Protocol (HTTP) transmission can be used to transmit and receive image data or various pieces of setting data via the network.

The error detection unit 128 is mainly a hardware sensor such as a temperature sensor or an optical sensor, and mainly detects a failure or trouble such as an increase in temperature or stopping of an operation for sheets of paper or a driving portion in the printing unit 120 or the reading unit 118, and then converts the detected failure or trouble into an electrical signal.

The error detection unit I/F 127 interconnects the error detection unit 128 and the control unit 110, makes the electrical signal received from the error detection unit 128 recognizable by a control program which is executed by the CPU 111.

The control program which is executed by the CPU 111 detects, as an error, for example, the temperature having increased over a predetermined value or the conveyance of a sheet of paper or the driving portion having stopped at unexpected timing, and then records the content of such an error on the storage 114. Moreover, the control program performs processing for displaying the occurrence of a failure or trouble (error) on the operation unit 116 or notifying an external apparatus of the error via the communication unit 126. Additionally, the control program performs detection of not only an error communicated with a signal output from the error detection unit 128, which is a hardware unit, but also stopping of a task by the control program itself or an error communicated from, for example, the communication unit 126, and performs similar processing such as recording of such an error on the storage 114.

<Hardware Configuration of Cloud Printing Service Server>

Figure 3:
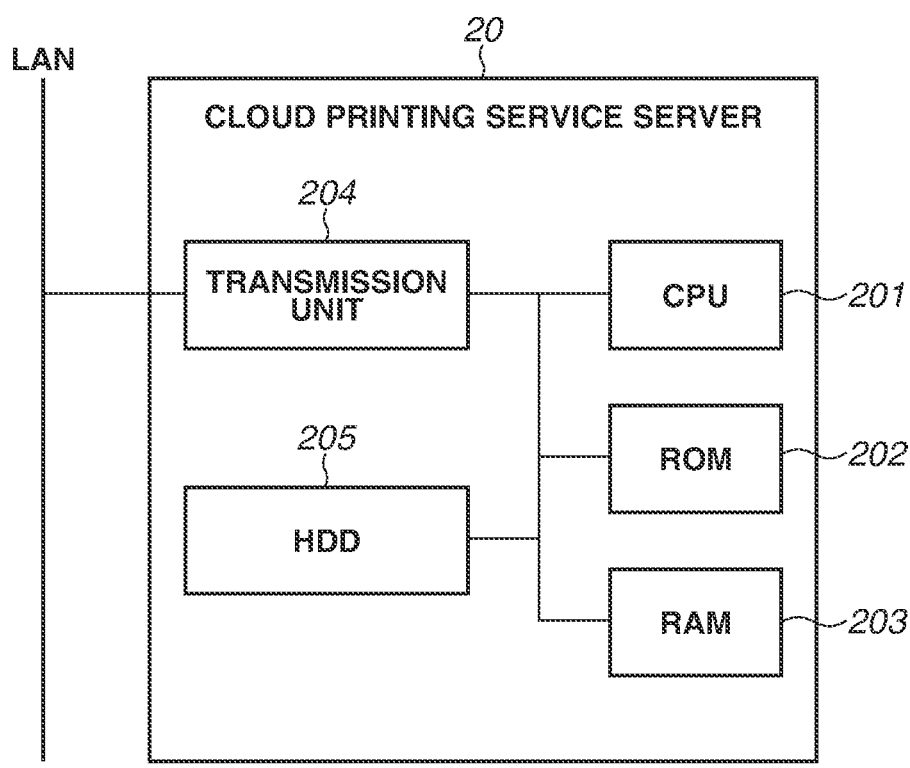
FIG. 3 is a diagram illustrating an example of a hardware configuration of a cloud printing service server.

FIG. 3 is a diagram illustrating an example of a hardware configuration of the cloud printing service server 20, which is an information processing apparatus.

A CPU 201 reads and loads a control program stored in a ROM 202 onto a RAM 203 and thus performs various processing operations for communicating with the MFP 10 and the function extension platform server 30.

The ROM 202 stores the control program.

The RAM 203 is used as a temporary storage region such as a main memory or work area for the CPU 201.

A transmission unit 204 performs transmission and reception of data with respect to, for example, the MFP 10 and the function extension platform server 30. Furthermore, the transmission unit 204 is assumed to perform communication using a wired local area network (LAN).

A hard disk drive (HDD) 205 stores, for example, event data of which the MFP 10 is to be notified.

<Hardware Configuration of Function Extension Platform Server>

Figure 4:
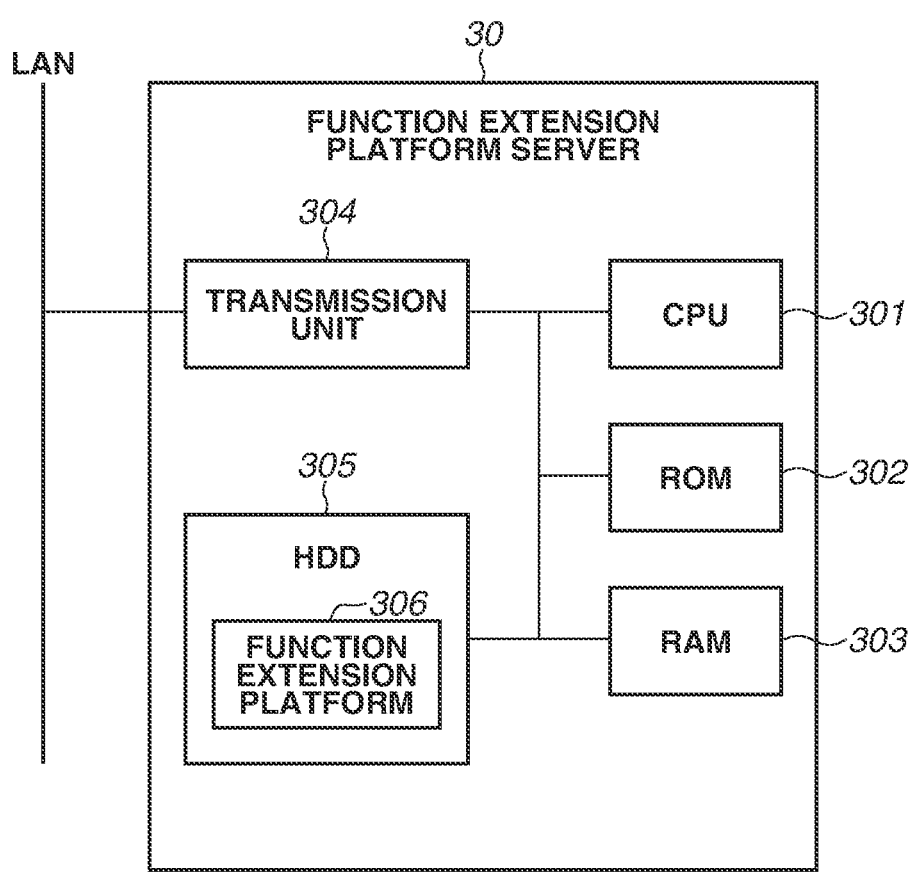
FIG. 4 is a diagram illustrating an example of a hardware configuration of a function extension platform server.

FIG. 4 is a diagram illustrating an example of a hardware configuration of the function extension platform server 30, which is an information processing apparatus.

A CPU 301 reads and loads a control program stored in a ROM 302 and a function extension platform 306 stored in an HDD 305 onto a RAM 303 and thus performs various processing operations for controlling operations of the function extension platform server 30.

The ROM 302 stores the control program.

The RAM 303 is used as a temporary storage region such as a main memory or work area for the CPU 301.

A transmission unit 304 performs transmission and reception of data with respect to various servers such as servers included in the function extension platform server 30 and the cloud computing 70. The transmission unit 304 is assumed to perform communication using a wired LAN.

The HDD 305 stores various pieces of data required for executing the function extension platform 306, such as printing execution information and order placement information (ordering information).

The function extension platform 306 is one of applications stored in the HDD 305 and is an application preliminarily stored in the function extension platform server 30.

<Hardware Configuration of Message Application Server>

FIG. 5 is a diagram illustrating an example of a hardware configuration of the message application server 40, which is an information processing apparatus.

A CPU 401 reads and loads a control program stored in a ROM 402 and various pieces of information stored in an HDD 405 onto a RAM 403 and thus performs various processing operations for controlling operations of the message application server 40.

The ROM 402 stores the control program.

The RAM 403 is used as a temporary storage region such as a main memory or work area for the CPU 401.

A transmission unit 404 performs transmission and reception of data with respect to various apparatuses such as the user terminal 50. The transmission unit 404 is assumed to perform communication using a wired LAN.

An HDD 405 stores various pieces of data such as messages, images, channel information, and applications. A message application 406 and a chat bot application 407 are previously installed on the HDD 405 and are then loaded onto the RAM 403.

The message application 406 is one of applications stored in the HDD 405 and is an application preliminarily stored in the message application server 40. The message application 406 running causes a message communication service (hereinafter referred to as a "chat") to be implemented.

The chat bot application 407 is one of applications stored in the HDD 405 and is an application which the user installs as needed. The chat bot application 407 is able to be created and registered by a third vendor which differs from a vendor which provides the message application 406. The chat bot application 407 has the function of relaying and posting a notification issued from the function extension platform server 30 on a message communication space of the message application server 40.

<Hardware Configuration of User Terminal>

Figure 6:
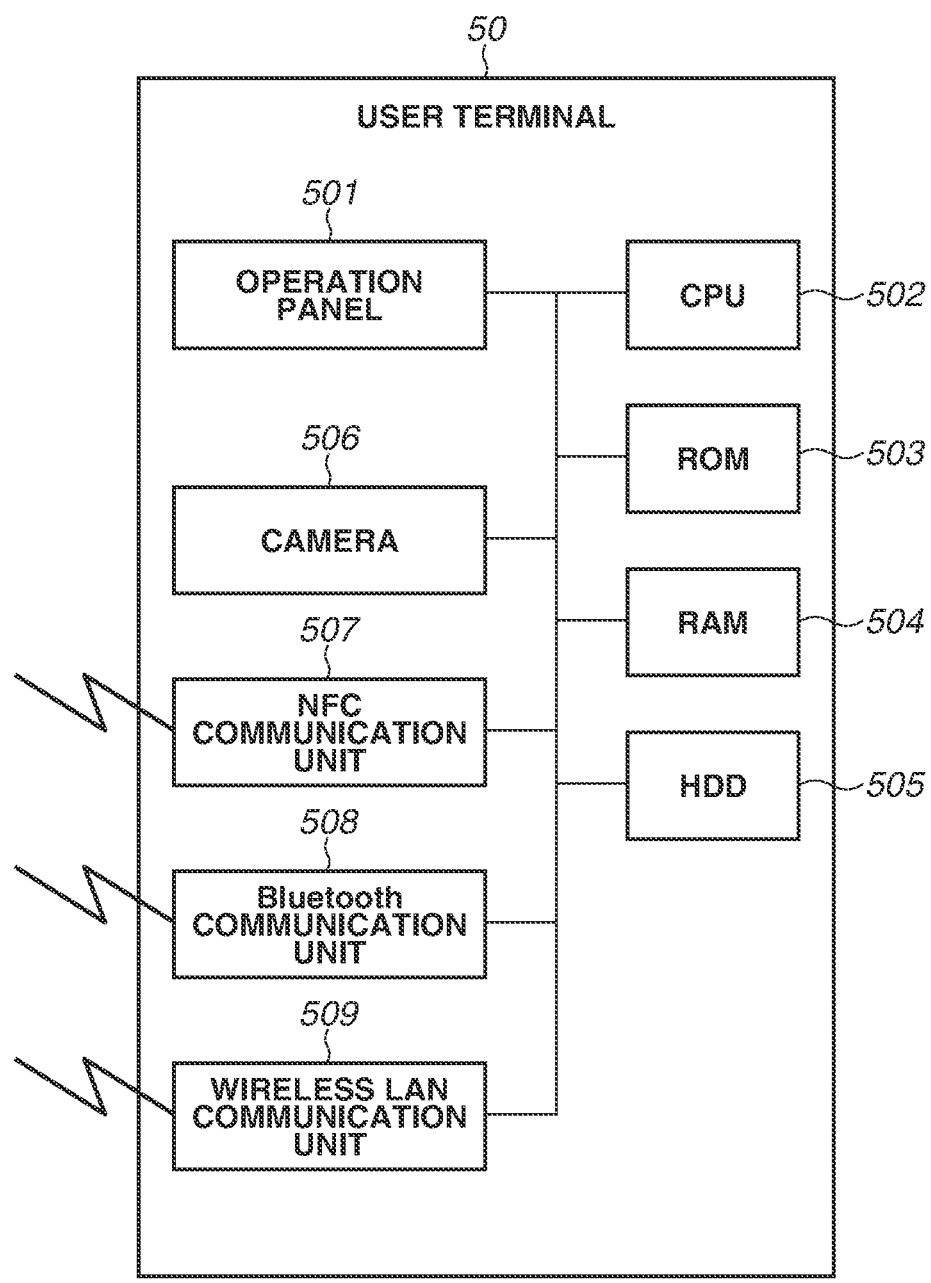
FIG. 6 is a diagram illustrating an example of a hardware configuration of a user terminal.

FIG. 6 is a diagram illustrating an example of a hardware configuration of the user terminal 50. Furthermore, the user terminal 50 in the first exemplary embodiment is assumed to be an apparatus such as a smartphone or a table personal computer (PC) but can be another type of apparatus as long as it is an information processing apparatus capable of connecting to a network via, for example, Wi-Fi communication.

A CPU 502 reads and loads a control program stored in a ROM 503 and various pieces of information stored in an HDD 505 onto a RAM 504 and thus performs various processing operations for controlling operations of the user terminal 50.

The ROM 503 stores the control program.

The RAM 504 is used as a temporary storage region such as a main memory or work area for the CPU 502.

The HDD 505 stores various pieces of data such as photographs and electronic documents.

An operation panel 501 includes a touch panel function capable of detecting a touch operation performed by the user, and displays various screens which an operating system (OS) and an e-mail transmission application provide. Moreover, the operation panel 501 is used for the user to check information stored in the message application server 40. The user inputs a touch operation to the operation panel 501, thus being able to input a desired operation instruction to the user terminal 50. Furthermore, the user terminal 50 is provided with hardware keys (not illustrated), so that the user can input an operation instruction to the user terminal 50 with use of the hardware keys.

A camera 506 performs image capturing in response to an image capturing instruction issued by the user. A photograph captured by the camera 506 is then stored in a predetermined region of the HDD 505. Moreover, a program capable of performing QR Code® analysis can be used to acquire information from a QR code read by the camera 506.

The user terminal 50 is able to perform transmission and reception of data with respect to various peripheral devices via a near-field communication (NFC) communication unit 507, a Bluetooth® communication unit 508, and a wireless LAN communication unit 509. The Bluetooth communication unit 508 of the user terminal 50 can be compatible with Bluetooth Low Energy.

<Hardware Configuration of Consumable Ordering Server>

Figure 7:
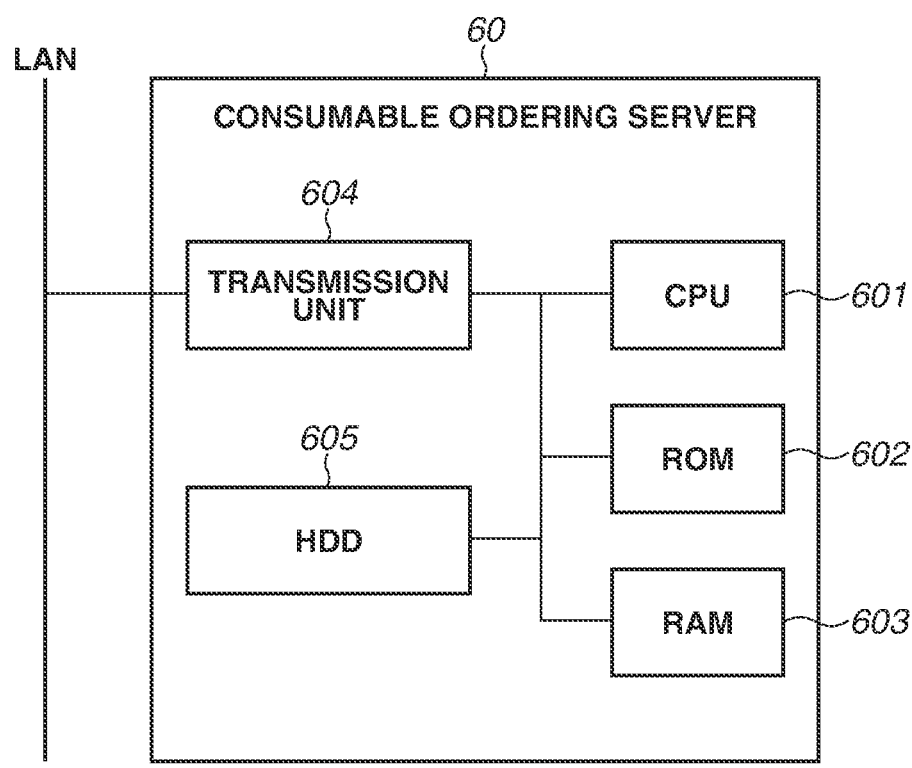
FIG. 7 is a diagram illustrating an example of a hardware configuration of a consumable ordering server.

FIG. 7 is a diagram illustrating an example of a hardware configuration of the consumable ordering server 60.

A CPU 601 reads and loads a control program stored in a ROM 602 and various pieces of information stored in an HDD 605 onto a RAM 603 and thus performs various processing operations for controlling operations of the consumable ordering server 60.

The ROM 602 stores the control program.

The RAM 603 is used as a temporary storage region such as a main memory or work area for the CPU 601.

A transmission unit 604 is able to perform transmission and reception of data with respect to various servers such as the function extension platform server 30 and servers included in the cloud computing 70. The transmission unit 604 is assumed to perform communication using a wired LAN.

An HDD 605 stores various pieces of data such as consumable order placement information (consumable ordering information).

<Tenant Information>

Figure 8:
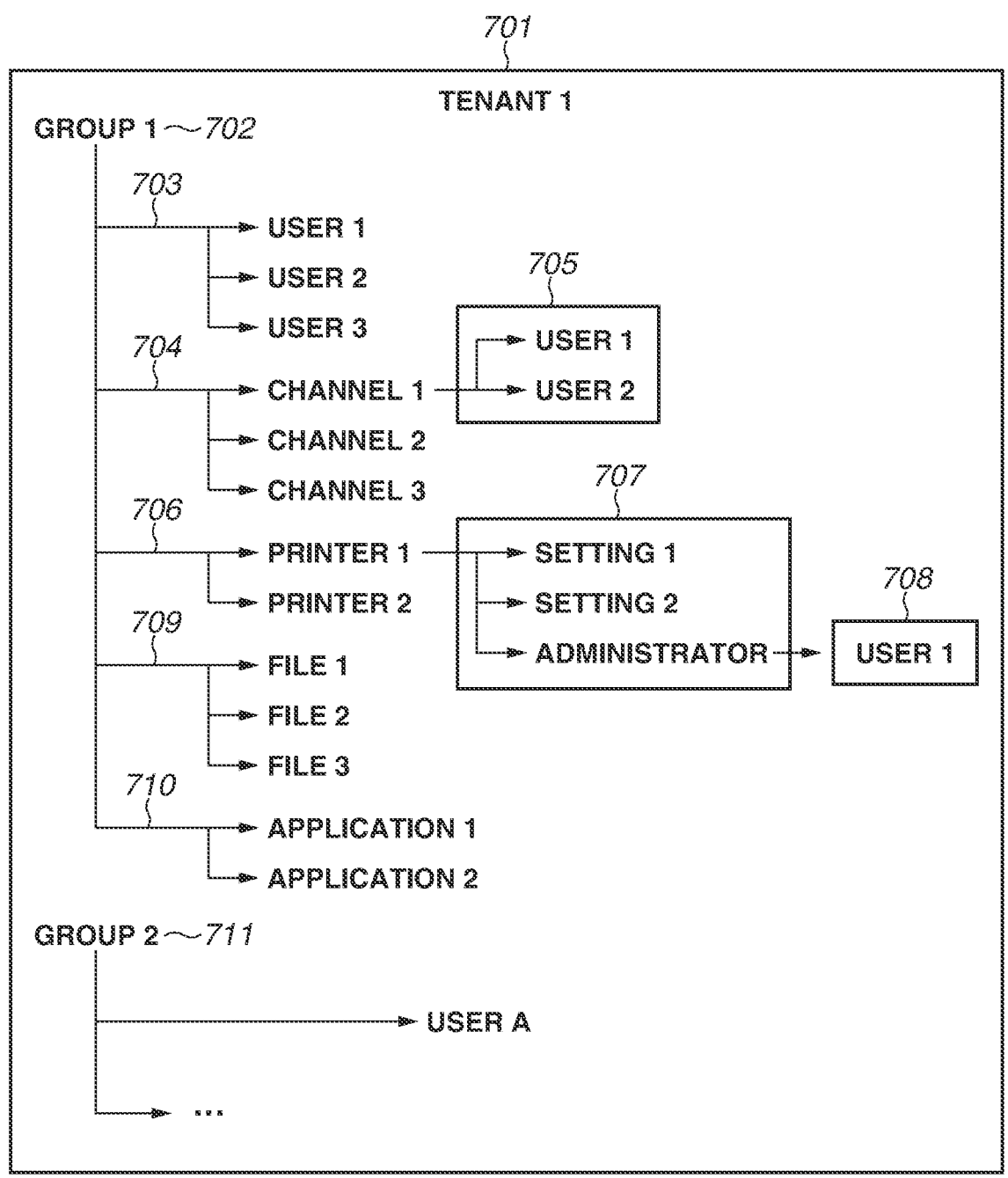
FIG. 8 is a diagram illustrating an example of tenant information.

FIG. 8 is a diagram illustrating an example of tenant information 701 which the message application server 40 retains. While, in the present configuration, the message application server 40 retains the tenant information 701, a configuration in which another server included in the cloud computing 70 retains the tenant information 701 can be employed.

The tenant information 701 includes one or more groups, and, in the example illustrated in FIG. 8, two groups 702 and 711 exist. Depending on a configuration of the message application 406, there is a case where only one piece of group information is included in one piece of tenant information, and, in such a case, the tenant information 701 and the group information become equivalent to each other.

Each of the groups 702 and 711 includes pieces of information which configure each group, and, for example, the group 702 includes user information 703, channel information 704, printer information 706, file information 709, and cooperative application information 710.

The user information 703 indicates pieces of information about respective users belonging to the applicable group.

The channel information 704 is information for grouping the user information 703, and retains a list 705 in which pieces of user information are collected for each channel. In the example illustrated in FIG. 8, respective pieces of user information about user 1 and user 2 are associated with channel 1.

The printer information 706 indicates an MFP 10 belonging to an applicable group. An application which uses the group information 702 refers to the printer information 706, thus becoming able to transmit various instructions to an optional MFP. Moreover, each piece of printer information includes device information 707. For example, appending the device information 707 to print job information enables performing printing with settings which the user has intended.

Moreover, the device information 707 allows administrator information about a printer to be set therein, so that user information 708 equivalent to an administrator is associated with the device information 707.

The file information 709 is information about a file retained in the group 702. The format of a file retained as the file information 709 is optional, so that the file information 709 can store various formats of file information, such as still image data, moving image data, and audio data.

The cooperative application information 710 is information about a cooperative application which cooperates with a message application 406 which provides a message communication service corresponding to the group 702. In a case where the chat bot application 407 is caused to serve as a cooperative application cooperating with the group 702, information about the chat bot application 407 is stored in the cooperative application information 710.

<Printer Function Information Table>

FIG. 9 illustrates an example of a printer function information table 800 which the function extension platform server 30 retains. The printer function information table 800 is stored in the HDD 305 included in the function extension platform server 30.

A printer column 801 stores the name of an optional printer, i.e., the MFP 10.

An administrator column 802 indicates administrator information about the MFP 10. Here, information in the printer column 801 and the administrator column 802 can be configured to be obtained by referring to the tenant information 701. In other words, the printer column 801 and the printer information 706 can be set as the same information, and the administrator column 802 and the administrator information 708 can be set as the same information.

While, in the present exemplary embodiment, one user is registered as an administrator, a configuration in which a plurality of administrators exists can be employed.

A chat room ID column 803 indicates an identifier (ID) of a message communication space serving as a destination which is notified of an order placement confirmation of a consumable for the printer 801. The ID of a message communication space is an identifier which is associated with each chat room on the chat bot application 407. An administrator and the chat bot application 407 are participating in a message communication space (hereinafter referred to as a "chat room") indicated by the chat room ID column 803. Then, notifying the chat room of a chat enables the participating administrator to confirm or check a message.

An ordering mode setting column 804 indicates an ordering mode. The ordering mode setting column 804 enables designating which of the MFP 10 and the function extension platform server 30 places an order. Here, in the case of a setting in which the MFP 10 places an order, although the MFP 10 is able to perform automatic ordering without via the function extension platform server 30 or the chat bot application 407, it becomes impossible to ask the user to confirm whether to place an order. In the case of a setting in which the function extension platform server 30 places an order, the function extension platform server 30 places an order according to a sequence described below. Since an ordering mode is able to be set for each printer, the present setting is able to be changed for each of a plurality of MFPs which is set to the same function extension platform server.

<Consumable Automatic Ordering Contract Information Table>

FIG. 10 is a diagram illustrating an example of a consumable automatic ordering contract information table 900 which the consumable ordering server 60 retains.

The consumable automatic ordering contract information table 900 is stored in the HDD 605 included in the consumable ordering server 60.

A printer column 901 indicates the name of a printer, i.e., the MFP 10. The printer column 901 indicates the same information as that in the printer column 801, so that, with use of the present information, it is possible to associate data in the consumable automatic ordering contract information table 900 with data in the printer function information table 800.

A consumable automatic ordering contract information column 902 stores information indicating whether an automatic ordering contract is effected. Referring to the consumable automatic ordering contract information column 902 enables determining whether an automatic ordering contract for a consumable is effected with respect to the applicable printer.

An automatic ordering mode column 903 indicates consumable automatic ordering execution information. In other words, in a case where it is stored that the contract is effected in the consumable automatic ordering contract information column 902 and it is stored that automatic ordering is to be performed in the automatic ordering mode column 903, automatic ordering for a consumable is performed.

Furthermore, while, in the present configuration, the consumable automatic ordering contract information table 900 and the printer function information table 800 are stored in respective different servers, a configuration in which such two tables are integrated to be stored can be employed.

<Install Processing for Chat Bot Application>

Figure 11:
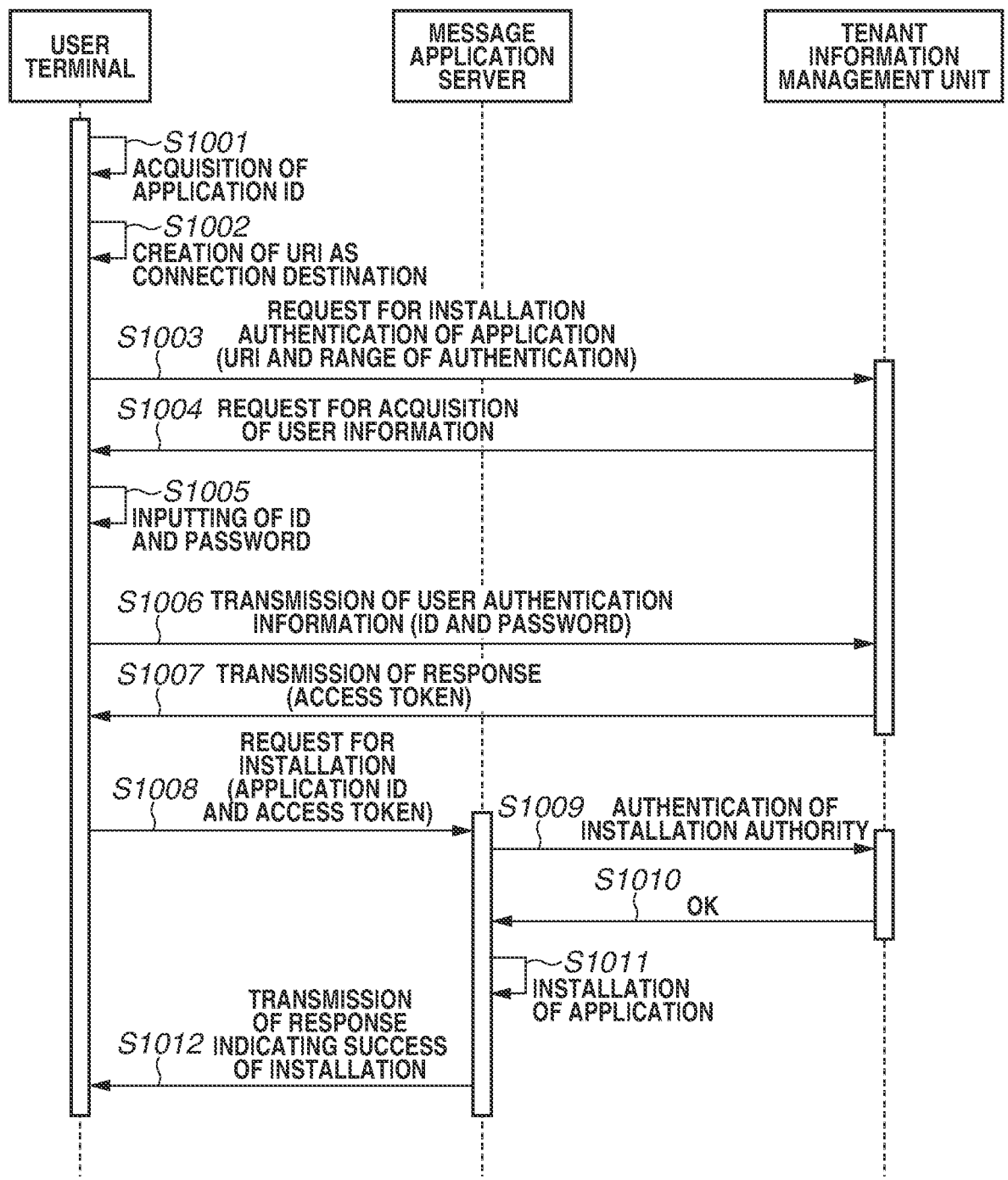
FIG. 11 is a sequence diagram illustrating a sequence for installing a chat bot application.

FIG. 11 illustrates a sequence for installing the chat bot application 407 on the HDD 405 of the message application server 40.

Figure 12A:
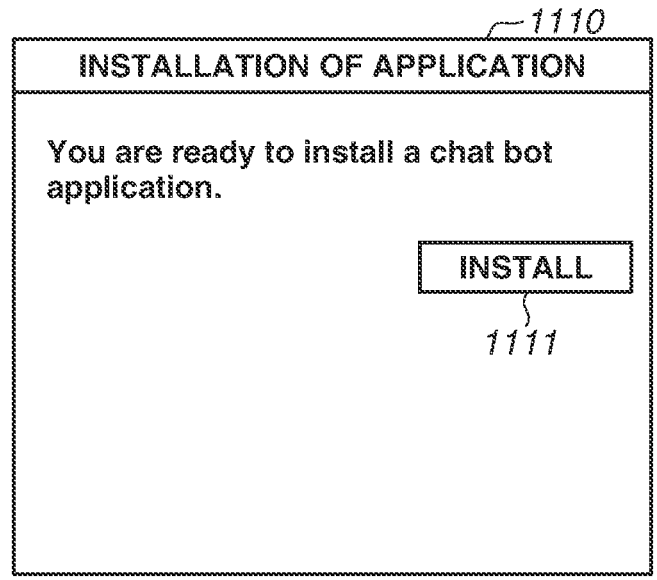
FIGS. 12A, 12B, and 12C are diagrams illustrating examples of screens which are displayed in installing the chat bot application.
Figure 12B:
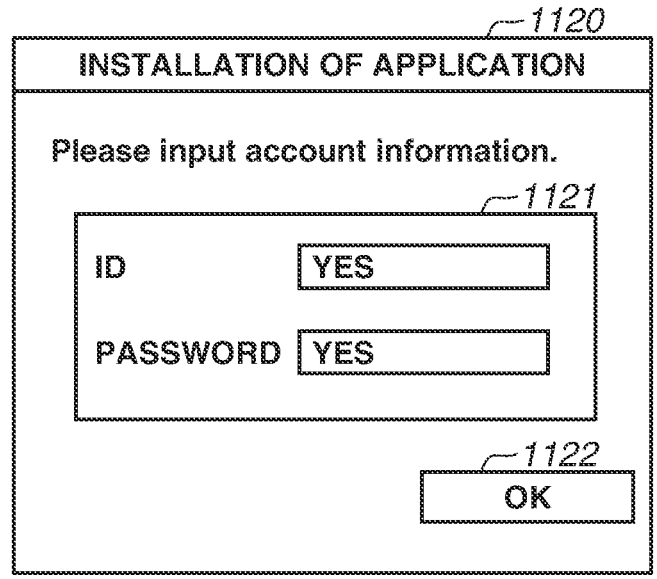
Figure 12C:
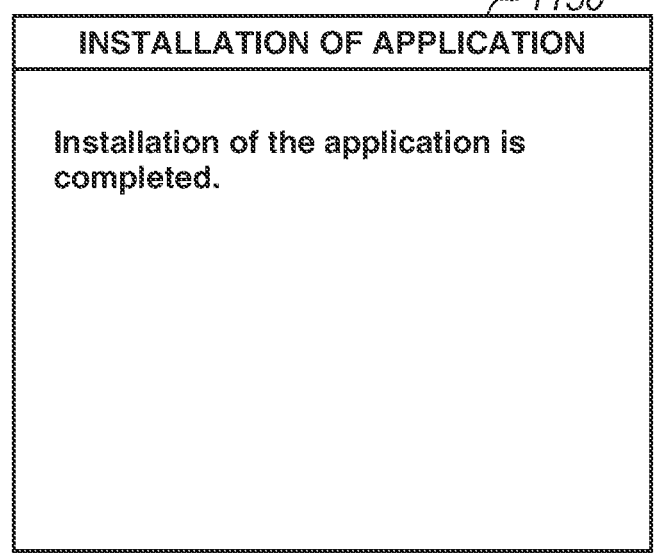

Moreover, FIGS. 12A, 12B, and 12C illustrate examples of screens which are used for installing the chat bot application 407 on the HDD 405 of the message application server 40 and which are displayed on the operation panel 501 of the user terminal 50. The screens illustrated in FIGS. 12A to 12C interlock with the sequence illustrated in FIG. 11 and are described in parallel with the subsequent description concerning FIG. 11.

The sequence illustrated in FIG. 11 is started in response to an instruction for installing the chat bot application 407 being issued from the operation panel 501 of the user terminal 50. The instruction for installation can be configured to be issued in response to a specific button existing in the message application 406 being pressed by the user. Moreover, the instruction for installation can be configured to be issued in response to another server (not illustrated) which performs installing of the chat bot application 407 being accessed by the user via the Internet.

FIG. 12A illustrates an installation start screen 1110. At timing when an instruction for installation has been issued by the above-mentioned optional method, i.e., at the time of start of the sequence illustrated in FIG. 11, the installation start screen 1110 is displayed on the operation panel 501. In response to an "install" button 1111 placed in the installation start screen 1110 being pressed, step S1001 illustrated in FIG. 11 is performed.

Referring back to FIG. 11, step S1001 indicates installation start timing, i.e., indicates that the installation start button 1111 has been pressed. In step S1001, the user terminal 50 acquires an application ID corresponding to the chat bot application 407 to create a Uniform Resource Identifier (URI) for requesting authentication. The application ID refers to a unique ID which is appended to an application able to be installed on the HDD 405. The application ID is preliminarily acquired at the time of an instruction for installing the chat bot application 407 being issued, i.e., before the start of the present sequence.

In step S1002, the user terminal 50 creates a URI for requesting authentication with use of the application ID acquired in step S1001.

In step S1003, the user terminal 50 requests, from a tenant information management unit of the cloud computing 70, authentication for installing the chat bot application 407 on the message application server 40, with use of the URI created in step S1002. At this time, the user terminal 50 notifies the tenant information management unit of a range of authentication to be requested as additional information. The authentication to be requested in the present sequence includes two types of items, i.e., installing the chat bot application 407 on the message application server 40 and changing the setting of the chat bot application 407 via the message application 406.

In step S1004, the tenant information management unit requests, from the user terminal 50, acquisition of information for performing user authentication included in the user information 703.

FIG. 12B illustrates an example of a tenant data input screen 1120, which is displayed on the operation panel 501 of the user terminal 50 in step S1004. The tenant data input screen 1120 is configured with an entry field 1121, in which to input authentication information associated with the user information 703, and an "OK" button 1122.

Referring back to FIG. 11, in step S1005, the user inputs authentication information (ID and password) associated with tenant data about the user himself or herself to the entry field 1121.

In step S1006, in response to the user pressing the "OK" button 1122, the user terminal 50 transmits the user authentication information to the tenant information management unit.

In step S1007, the tenant information management unit performs user authentication with use of the user authentication information received in step S1006. In a case where it is determined that the authenticated user information 703 possesses authentication authority for application installation, the tenant information management unit performs authentication for installation authority and thus transmits, to the user terminal 50, an access token for application installation authentication as a response.

In step S1008, the user terminal 50 requests, from the message application server 40, installation of the chat bot application 407. At this time, the terminal 50 transmits, as additional information, the application ID acquired in step S1001 and the access token acquired in step S1007.

In step S1009, the message application server 40 requests the tenant information management unit included in the cloud computing 70 to check whether authentication of installation authority has been performed.

In step S1010, the tenant information management unit transmits, as a response, information indicating that authentication of installation authority has been performed to the message application server 40.

In step S1011, the message application server 40 starts installation of the chat bot application 407. With regard to an acquisition destination of data for installation, the message application server 40 can be configured to acquire the data from an external site designated via the Internet, or can be configured to acquire data preliminarily prepared on the cloud computing 70.

In a case where the installation is successful in step S1011, then in step S1012, the message application server 40 notifies the user terminal 50 of information indicating that the installation is successful. Upon receiving a notification of the installation being successful, the user terminal 50 displays an installation success screen 1130 illustrated in FIG. 12C on the operation panel 501.

With the above-described configuration employed, the user is able to install the chat bot application 407 on the HDD 405 included in the message application server 40.

<Parameter Setting Processing in Each Table>

Figure 13:
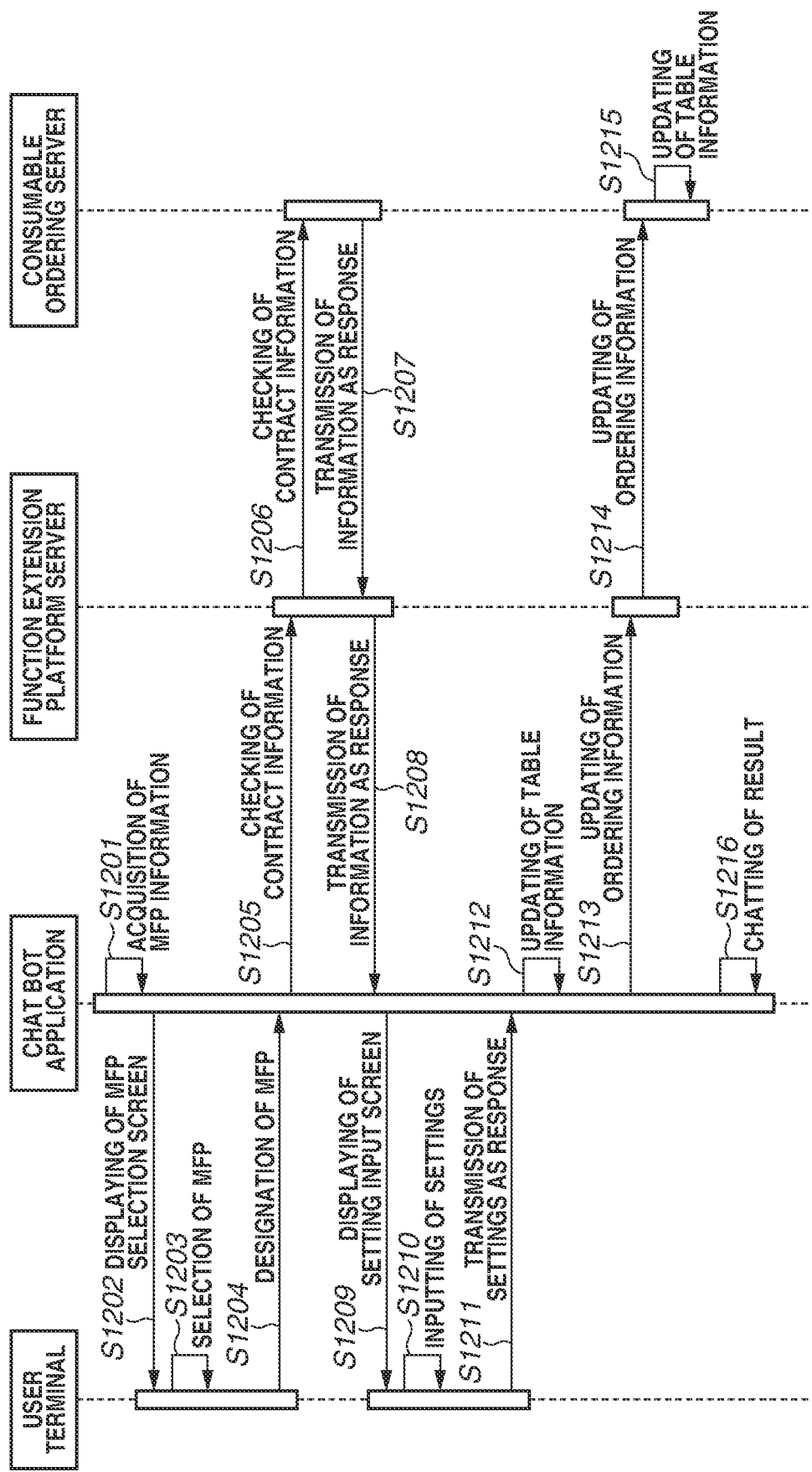
FIG. 13 is a sequence diagram for setting parameters included in a table.

FIG. 13 illustrates a sequence for setting respective parameters of the printer function information table 800 and the consumable automatic ordering contract information table 900.

Figure 14A:
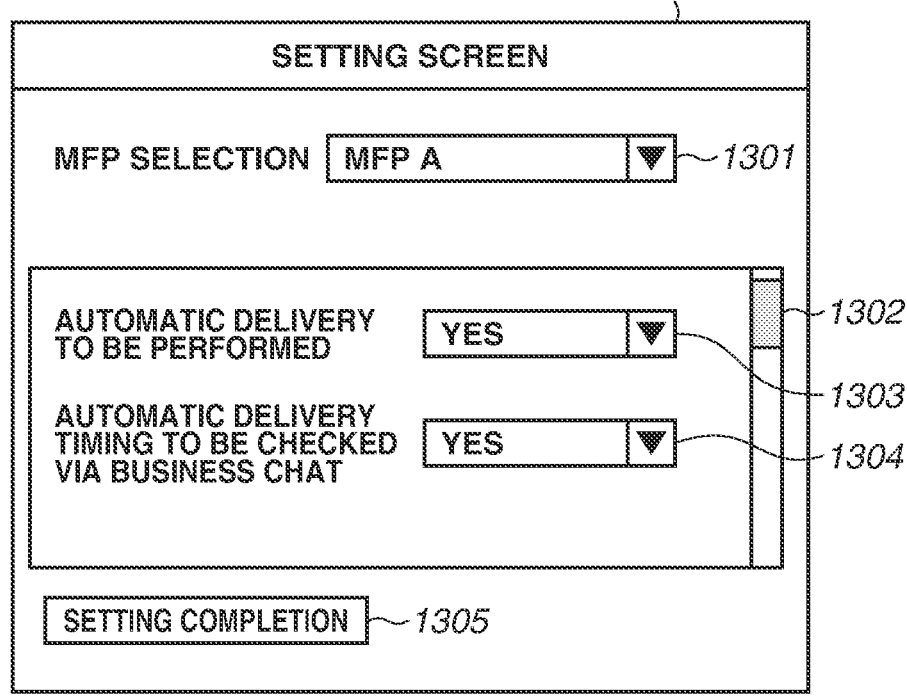
FIGS. 14A and 14B are diagrams illustrating examples of setting screens for tables (a printer function information table and a consumable automatic ordering contract information table).

Moreover, FIG. 14A illustrated an example of a setting screen 1300 for setting the printer function information table 800 and the consumable automatic ordering contract information table 900, which is displayed on the operation panel 501 of the user terminal 50. The setting screen 1300 is able to be used to set three items, i.e., an MFP selection item 1301, an automatic delivery execution setting item 1303, and an ordering mode setting item 1304, the setting items 1303 and 1304 being surrounded by a group 1302, and includes a "setting completion" button 1305. The screen illustrated in FIG. 14A interlocks with the sequence illustrated in FIG. 13 and is, therefore, described in parallel with the subsequent description concerning FIG. 13.

The sequence illustrated in FIG. 13 is started in response to the chat bot application 407 included in the message application server 40 calling up the setting screen 1300. While the timing for calling up is assumed to be a case where a specific button displayed by the chat bot application 407 has been pressed, a configuration in which the setting screen 1300 is called up immediately after the installation sequence for the chat bot application 407 illustrated in FIG. 11 has ended can be employed.

In step S1201, the chat bot application 407 included in the message application server 40 acquires printer information 706 as an MFP information list.

In step S1202, the chat bot application 407 included in the message application server 40 transmits the setting screen 1300 illustrated in FIG. 14A to the user terminal 50. At this time, the setting screen 1300 is assumed to be set to a state in which information included in the group 1302 is unable to be set due to, for example, gray-out and only the MFP selection item 1301 is able to be set. A list of pieces of MFP information which are able to be set in the MFP selection item 1301 is created from the printer information 706.

In step S1203, the user terminal 50 displays, on the operation panel 501, the screen 1300 communicated in step S1202. The user selects optional MFP information 706 from the MFP selection item 1301.

Next, in step S1204, the user terminal 50 notifies the chat bot application 407 included in the message application server 40 of the selected MFP information.

In step S1205, the chat bot application 407 included in the message application server 40 requests the function extension platform server 30 to check contract information included in the selected MFP information.

In step S1206, the function extension platform server 30 requests the consumable ordering server 60 to check the contract information.

In step S1207, the consumable ordering server 60 acquires consumable automatic ordering contract information 902 corresponding to the MFP information from the consumable automatic ordering contract information table 900, and then transmits, as a response, the acquired consumable automatic ordering contract information 902 to the function extension platform server 30.

In step S1208, the function extension platform server 30 transmits, as a response, the consumable automatic ordering contract information 902 corresponding to the MFP information to the chat bot application 407 included in the message application server 40.

Figure 14B:
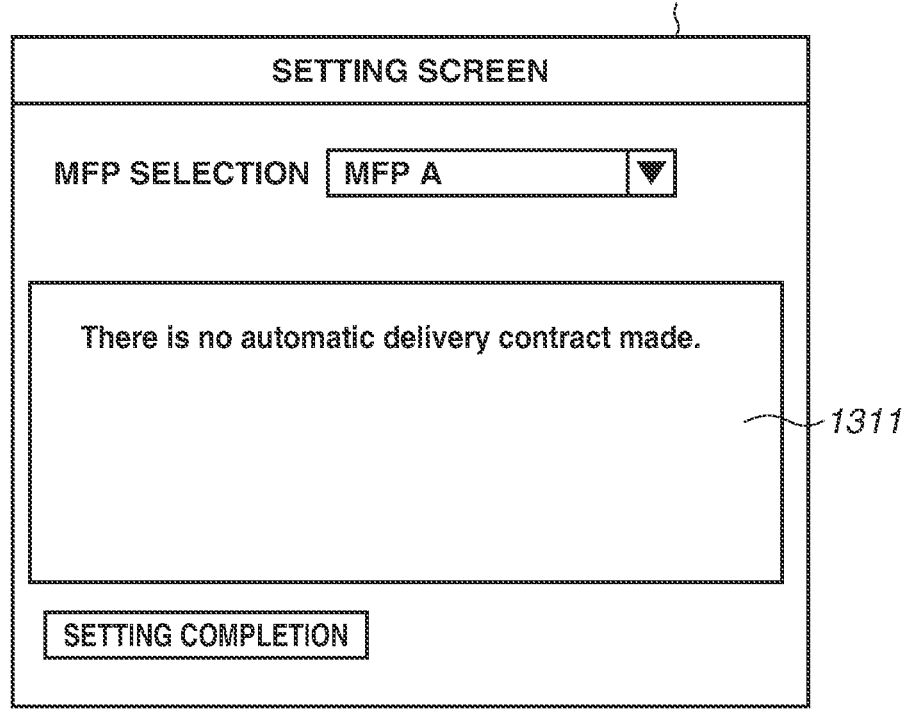

In step S1209, the chat bot application 407 included in the message application server 40 transmits information about the setting screen 1300 illustrated in FIG. 14A or a setting screen 1310 illustrated in FIG. 14B to the user terminal 50. Here, in a case where the consumable automatic ordering contract information 902 communicated in step S1208 indicates the presence of a contract, all of the parameters including information included in the group 1302 are made settable (FIG. 14A). Moreover, in a case where the communicated consumable automatic ordering contract information 902 indicates the absence of a contract, a message 1311 indicating that there is no contract made is displayed as in the screen 1310 (FIG. 14B). In the following description, the sequence is described on the assumption of the presence of a contract.

In step S1210, the user terminal 50 displays the setting screen 1300 communicated in step S1209 on the operation panel 501 (FIG. 14A). The user sets the automatic delivery execution setting item 1303 and the ordering mode setting item 1304.

In step S1211, the user terminal 50 notifies the chat bot application 407 included in the message application server 40 of the automatic delivery execution setting item 1303 and the ordering mode setting item 1304 which have been set.

In step S1212, the chat bot application 407 included in the message application server 40 updates the ordering mode 804 included in the printer function information table 800 with the information set in the ordering mode setting item 1304.

In step S1213, the chat bot application 407 included in the message application server 40 notifies the function extension platform server 30 of the information set in the automatic delivery execution setting item 1303.

In step S1214, the function extension platform server 30 notifies the consumable ordering server 60 of the information set in the automatic delivery execution setting item 1303.

In step S1215, the consumable ordering server 60 updates the consumable automatic ordering execution information 903 included in the consumable automatic ordering contract information table 900 with the information set in the automatic delivery execution setting item 1303.

In step S1216, the chat bot application 407 included in the message application server 40 checks whether the chat room ID information 803 already exists. In a case where the chat room ID information 803 already exists, the chat bot application 407 notifies a chat room corresponding to the chat room ID of a message indicating that the information has been updated. In a case where the chat room ID information 803 does not exist, the chat bot application 407 creates a chat room in which the user of the administrator information 708 associated with the selected MFP information 706 and the chat bot application 407 participate. Then, the chat bot application 407 stores the administrator information 802 and the chat room ID information 803, and notifies the created chat room of a message indicating that the information has been updated.

With the above-described configuration employed, it is possible to set respective parameters of the printer function information table 800 and the consumable automatic ordering contract information table 900.

<Notification Processing for Consumable Ordering>

FIG. 15 illustrates a sequence in which the function extension platform server 30 notifies the consumable ordering server 60 of ordering of a consumable at consumable ordering timing detected from the consumable remaining amount information acquired from the consumable remaining amount detection unit 122 of the MFP 10. Furthermore, while, in the present sequence, operations which are performed when the ordering is approved by the user are illustrated, operations which are performed when the ordering is not approved by the user are described below with reference to flowcharts illustrated in FIG. 17 and FIG. 18.

In step S1401, the MFP 10 notifies the cloud printing service server 20 of the consumable remaining amount information detected by the consumable remaining amount detection unit 122. The consumable remaining amount information is information obtained by converting the value acquired by the consumable remaining amount detection unit 122 into a percentage of 0% to 100%. While the timing for notification is assumed to be a case where the consumable remaining amount information, i.e., a value obtained by conversion into a percentage, has changed, a configuration in which the consumable remaining amount information is periodically communicated with polling processing can be employed. The cloud printing service server 20 then stores the communicated consumable remaining amount information in the RAM 203 or the ROM 202.

In step S1402, the function extension platform server 30 detects timing of printer information acquisition. In the present configuration, acquisition of printer information is performed periodically, so that step S1402 is performed at timing when a predetermined time has elapsed after the last printer information acquisition timing and processing operations in step S1403 and subsequent steps are sequentially performed.

In step S1403, the function extension platform server 30 requests the cloud printing service server 20 to acquire printer information including the consumable remaining amount information.

In step S1404, the cloud printing service server 20 transmits, as a response, the printer information including the consumable remaining amount information to the function extension platform server 30.

In step S1405, the function extension platform server 30 determines whether the acquired consumable remaining amount information is less than a threshold value. The threshold value can be set to a predetermined value or can be set to a value which the user sets in a flow (not illustrated). In a case where it is determined that the acquired consumable remaining amount information is less than the threshold value and consumable ordering for a new one corresponding to the applicable consumable has not yet been performed, the function extension platform server 30 determines that the consumable ordering timing has come and then advances the processing to step S1406 and subsequent steps.

In step S1406, the function extension platform server 30 requests the chat bot application 407 included in the message application server 40 to check whether ordering of a consumable is allowed to be performed. At this time, the function extension platform server 30 transmits, additional information, the administrator information 802 and the chat room ID information 803. Upon receiving the request for ordering check in step S1406, the chat bot application 407 performs processing operations in step S1407 and subsequent steps.

While, here, the function extension platform server 30 makes a request for checking whether ordering is allowed to be performed with respect to all of the consumables, a configuration in which, depending on the setting performed by the user, the function extension platform server 30 is able to select execution of a checking request to a chat room for each consumable can be employed.

Furthermore, while, in the present sequence, a data pull method in which, in steps S1402 to S1404, the function extension platform server 30 periodically inquires of the cloud printing service server 20 about the remaining amount of a consumable of the MFP is employed, a data push method can be employed. Specifically, a configuration in which, when receiving a print job input by the user, the cloud printing service server 20 notifies the function extension platform server 30 of the remaining amount of a consumable of an MFP which executes the print job can be employed.

Figure 16:
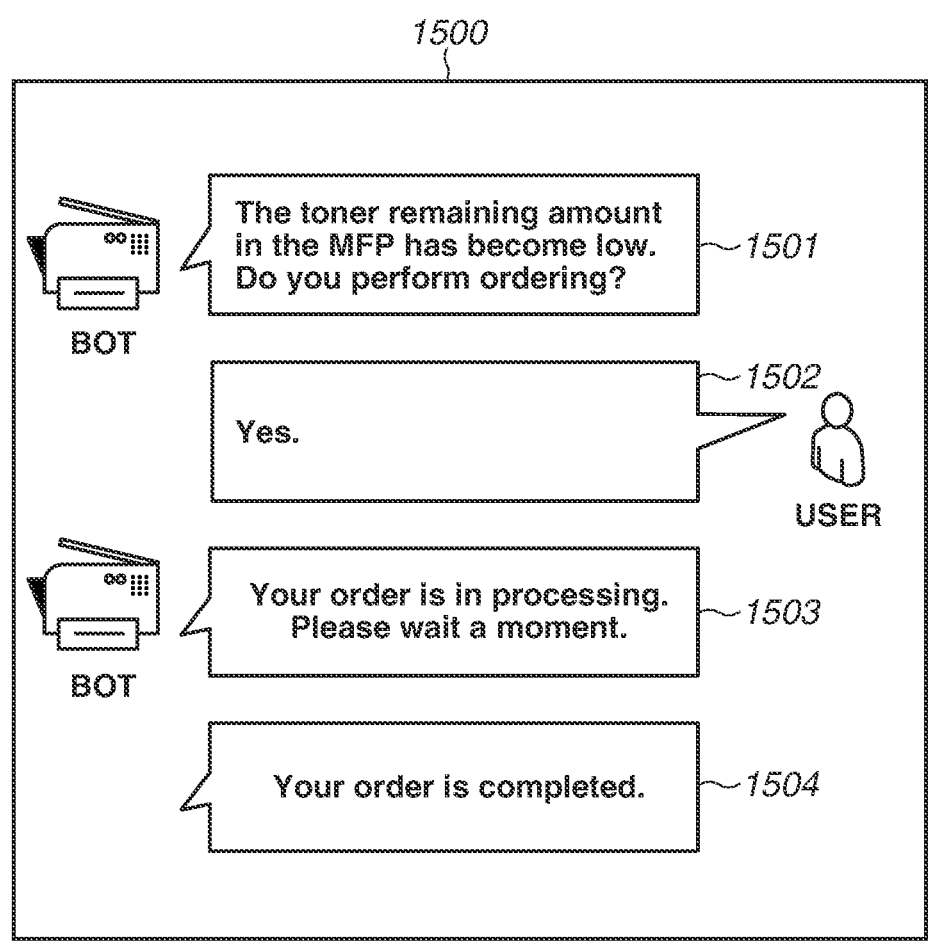
FIG. 16 is a diagram illustrating an example of a chat room screen which is created by a message application.

FIG. 16 illustrates an example of a chat room screen 1500, which is created by the message application 406 included in the message application server 40 at the consumable ordering timing and which is displayed on the operation panel 501 of the user terminal 50. Chats illustrated in FIG. 16 are utilized in the sequence illustrated in FIG. 15 and are, therefore, described in parallel with the subsequent description concerning FIG. 15.

In step S1407, the chat bot application 407 included in the message application server 40 posts a chat 1501 having the following content on a chat room corresponding to the chat room ID information 803 in which the chat bot application 407 is participating. The content of the chat 1501 includes a message indicating that the remaining amount of toner, which is a consumable for the MFP 10, has become low and information for prompting the user to perform consumable ordering.

In step S1408, the user inputs a reply indicating allowance of ordering as a chat 1502 in the form of a response to the chat 1501 in the chat room screen 1500 displayed on the operation panel 501.

In step S1409, in response to the chat 1502 being input as a user's reply, the message application 406 notifies the chat bot application 407 included in the message application server 40 of the content of the input chat 1502. At the same time, the message application 406 displays, as a chat 1503, information indicating that ordering processing is in progress on the chat room screen 1500.

In step S1410, the chat bot application 407 included in the message application server 40 notifies the function extension platform server 30 of the content of the message input as the chat 1502.

In step S1411, the function extension platform server 30 determines whether the communicated message is a message for approving consumable ordering. In a case where it is determined that the communicated message is a message for approving consumable ordering, the function extension platform server 30 advances the processing to step S1412 and subsequent steps.

In step S1412, the function extension platform server 30 notifies the consumable ordering server 60 of the request for ordering of a consumable.

In step S1413, the consumable ordering server 60 performs ordering processing for a consumable. Here, if the order processing is successful, then in step S1414, the consumable ordering server 60 notifies the function extension platform server 30 that the consumable ordering processing has been completed.

In step S1415, the function extension platform server 30 notifies the chat bot application 407 included in the message application server 40 of the completion of ordering.

In step S1416, the chat bot application 407 included in the message application server 40 causes a chat 1504 indicating the completion of ordering to be displayed on the chat room screen 1500.

Furthermore, the configuration of the present disclosure should not be construed to be limited to the above-described exemplary embodiment. For example, while, in the present exemplary embodiment, the user uses the chat 1502 as a method for indicating the allowance of ordering, a configuration in which a "place an order" button and a "do not place an order" button are provided in the chat 1501 to prompt the user to press one of them can be employed. Alternatively, a configuration in which a "place an order" button and a "do not place an order" button are displayed at optional places in the chat room screen 1500 to prompt the user to press one of them can be employed.

In the above-described exemplary embodiment, a configuration in which the MFP 10 notifies the function extension platform server 30 of the ordering timing via the cloud printing service server 20 is employed. Instead of this configuration, a configuration in which the function extension platform server 30 directly refers to the remaining amount to determine ordering timing can be employed.

<Processing Operations of Function Extension Platform Server>

Figure 17:
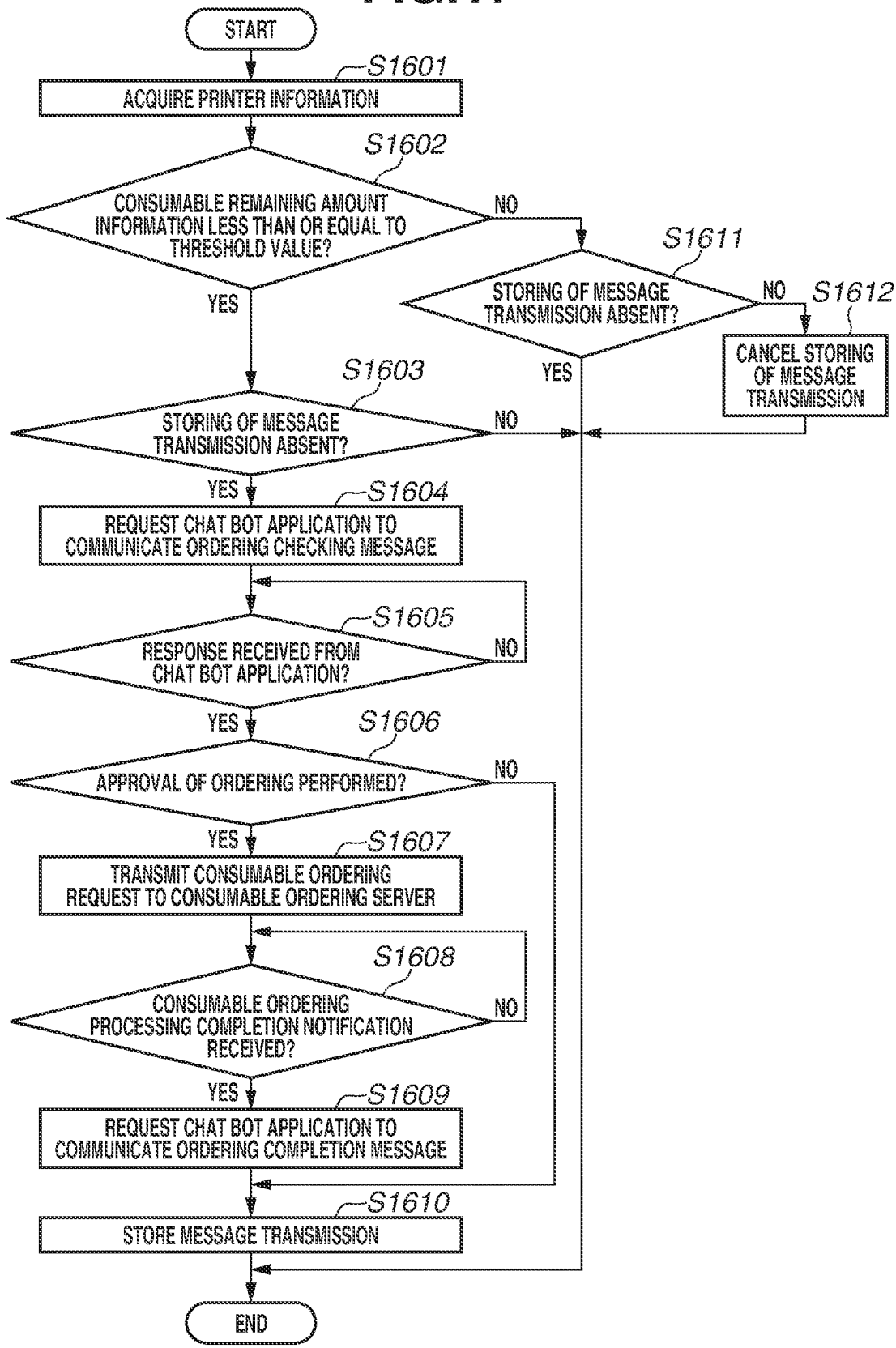
FIG. 17 is a flowchart illustrating a control operation which the function extension platform server performs.

FIG. 17 is a flowchart illustrating control operations which the function extension platform server 30 performs. The present flowchart illustrates operations of the function extension platform server 30 illustrated in the sequence diagram of FIG. 15. The processing in the present flowchart is started at timing when a predetermined time has elapsed after the last execution of the flow.

In step S1601, the function extension platform server 30 acquires printer information including consumable remaining amount information from the cloud printing service server 20.

In step S1602, the function extension platform server 30 determines whether the acquired consumable remaining amount information is less than or equal to a predetermined threshold value. If it is determined that the acquired consumable remaining amount information is less than or equal to the threshold value (YES in step S1602), the function extension platform server 30 advances the processing to step S1603. Moreover, if it is determined that the acquired consumable remaining amount information exceeds the threshold value (NO in step S1602), the function extension platform server 30 advances the processing to step S1611.

In step S1603, the function extension platform server 30 checks with the chat bot application 407 whether storing of the transmission of an ordering checking message is absent. If it is determined that storing of the transmission is absent (YES in step S1603), the function extension platform server 30 advances the processing to step S1604. If it is determined that storing of the transmission is present (NO in step S1603), the function extension platform server 30 ends the processing.

In step S1604, the function extension platform server 30 requests the chat bot application 407 to transmit an ordering checking message. Thus, step S1604 is processing equivalent to step S1406 illustrated in FIG. 15. At this time, the function extension platform server 30 acquires, from the table 800 illustrated in FIG. 9, chat room ID information 803 corresponding to MFP information 801 from which the communicated consumable remaining amount information has been acquired, and also notifies the chat bot application 407 of the acquired chat room ID information 803 as a message transmission destination.

In step S1605, the function extension platform server 30 waits for a response to the ordering checking message transmitted in step S1604. Thus, step S1605 is processing equivalent to step S1410 illustrated in FIG. 15. If detecting the response (YES in step S1605), the function extension platform server 30 advances the processing to step S1606.

In step S1606, the function extension platform server 30 determines, based on the content of the response to the ordering checking message, whether the approval of ordering has been performed. Specifically, if a specific character string, such as "Yes" or "OK", is included in the content, the function extension platform server 30 determines that the approval of ordering has been performed. If it is determined that the approval of ordering has been performed (YES in step S1606), the function extension platform server 30 advances the processing to step S1607, and, if the approval of ordering has not been performed (NO in step S1606), the function extension platform server 30 advances the processing to step S1610.

In step S1607, the function extension platform server 30 transmits a consumable delivery request to the consumable ordering server 60. Thus, step S1607 is processing equivalent to step S1412 illustrated in FIG. 15.

In step S1608, the function extension platform server 30 waits for a consumable delivery processing completion notification corresponding to the consumable delivery request transmitted in step S1607. Thus, step S1608 is processing equivalent to step S1414 illustrated in FIG. 15. If detecting the consumable delivery processing completion notification (YES in step S1608), the function extension platform server 30 advances the processing to step S1609.

In step S1609, the function extension platform server 30 requests the chat bot application 407 to transmit an ordering completion message. Thus, step S1609 is processing equivalent to step S1415 illustrated in FIG. 15.

In step S1610, the function extension platform server 30 stores information indicating that the ordering checking message has been transmitted. In response to the present information being stored, in step S1603 or S1611, it becomes determined that storing of the transmission of an ordering checking message is present, so that it is possible to prevent multiple notification of an ordering request.

If it is determined that the acquired consumable remaining amount information is greater than the threshold value (NO in step S1602), the function extension platform server 30 advances the processing to step S1611.

In step S1611, the function extension platform server 30 checks with the chat bot application 407 whether storing of the transmission of an ordering checking message is absent. If it is determined that storing of the transmission is absent (YES in step S1611), the function extension platform server 30 ends the processing. If it is determined that storing of the transmission is present (NO in step S1611), the function extension platform server 30 advances the processing to step S1612.

In step S1612, the function extension platform server 30 cancels storing of the information indicating that the ordering checking message has been transmitted. The use case where the processing reaches this step in a state in which the ordering checking message has been transmitted indicates that a consumable has been replaced. Therefore, to perform ordering checking determination again, the function extension platform server 30 transitions to a state in which the ordering checking message is not yet transmitted, and then ends the processing.

<Processing Operations of Chat Bot Application>

Figure 18:
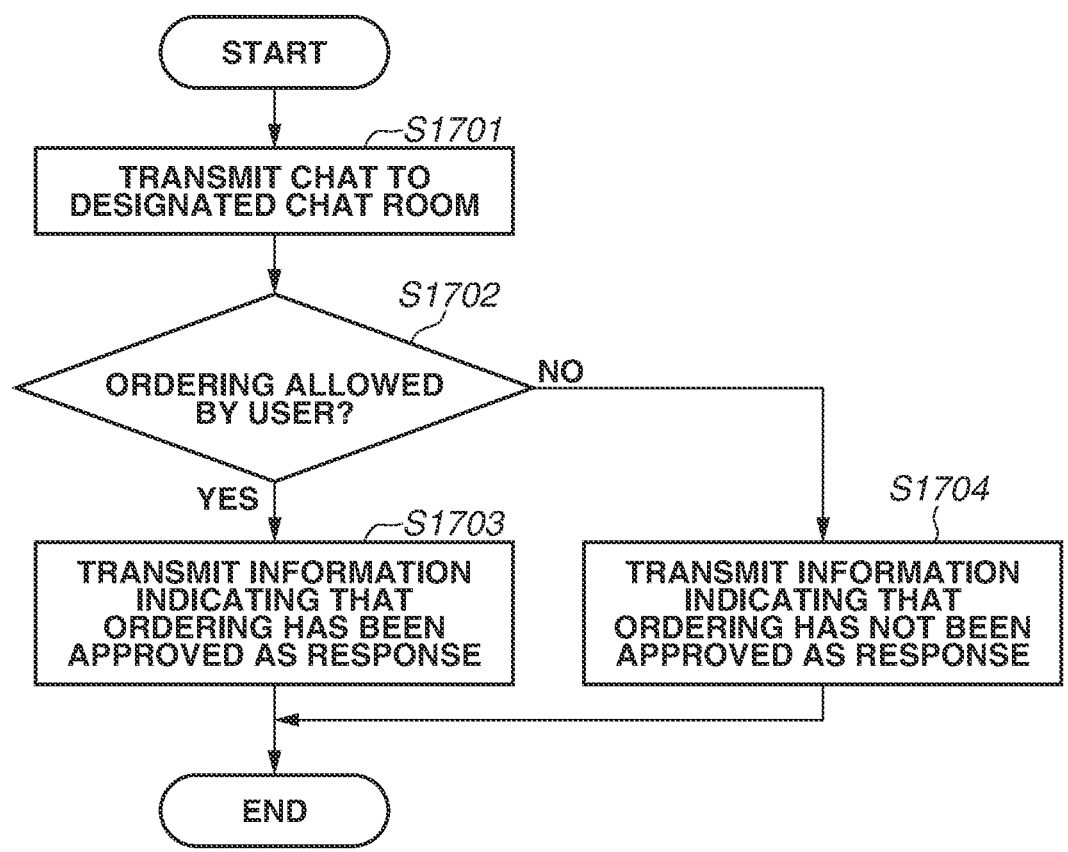
FIG. 18 is a flowchart illustrating a control operation which the chat bot application performs.

FIG. 18 is a flowchart illustrating control operations which the chat bot application 407 performs. The present flowchart illustrates operations of the chat bot application 407 illustrated in the sequence diagram of FIG. 15. The processing in the present flowchart is started at timing when the chat bot application 407 has received the ordering checking message transmission request from the function extension platform server 30, i.e., with processing in step S1604 set as a trigger.

In step S1701, the chat bot application 407 transmits a chat 1501 for prompting the user to place an order for a consumable to a chat room associated with the chat room ID information 803.

In step S1702, the user inputs the allowance or non-allowance of ordering with the chat 1502. The chat bot application 407 analyzes the chat input by the user, and, if determining that the ordering has been allowed (YES in step S1702), the chat bot application 407 advances the processing to step S1703, and if determining that the ordering has not been allowed (NO in step S1702), the chat bot application 407 advances the processing to step S1704.

In step S1703, the chat bot application 407 notifies the function extension platform server 30 that the ordering has been approved, and then ends the processing.

In step S1704, the chat bot application 407 notifies the function extension platform server 30 that the ordering has not been approved, and then ends the processing.

With the above-described configuration employed, at predetermined consumable ordering timing, the function extension platform server 30 is able to check with the user whether to make a consumable ordering request to the consumable ordering server 60. This enables preventing or reducing unnecessary consumable ordering, and also enables an ordering high in instantaneity to be performed with the user's intention.

The above-described configuration enables the function extension platform server 30 to perform an ordering request for a consumable. However, as a general configuration, there is a configuration in which the MFP 10 directly performs an ordering request, and, therefore, it can be considered that both this configuration and the above-described configuration are desired to be satisfied simultaneously. In the following description, a configuration in which of the function extension platform server 30 and the MFP 10 performs an ordering request for a consumable is able to be selected via the user terminal 50 is described.

<Setting Change Processing for Ordering Mode>

Figure 19:
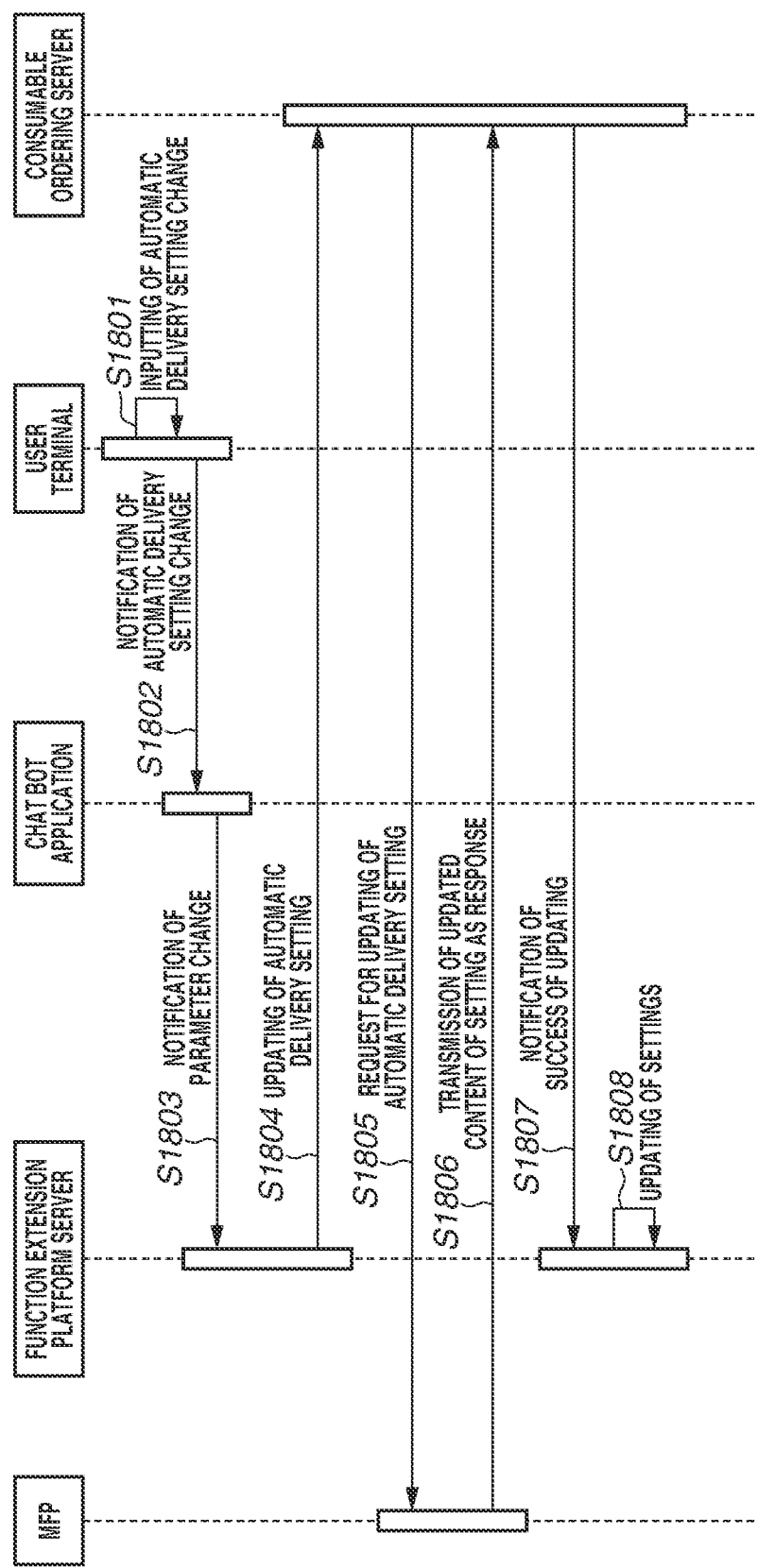
FIG. 19 is a sequence diagram illustrating a control operation for changing a setting of an ordering mode which is associated with the MFP.

FIG. 19 illustrates a sequence for changing the setting of the ordering mode 804 associated with the MFP 10 via the chat bot application 407.

Figure 20:
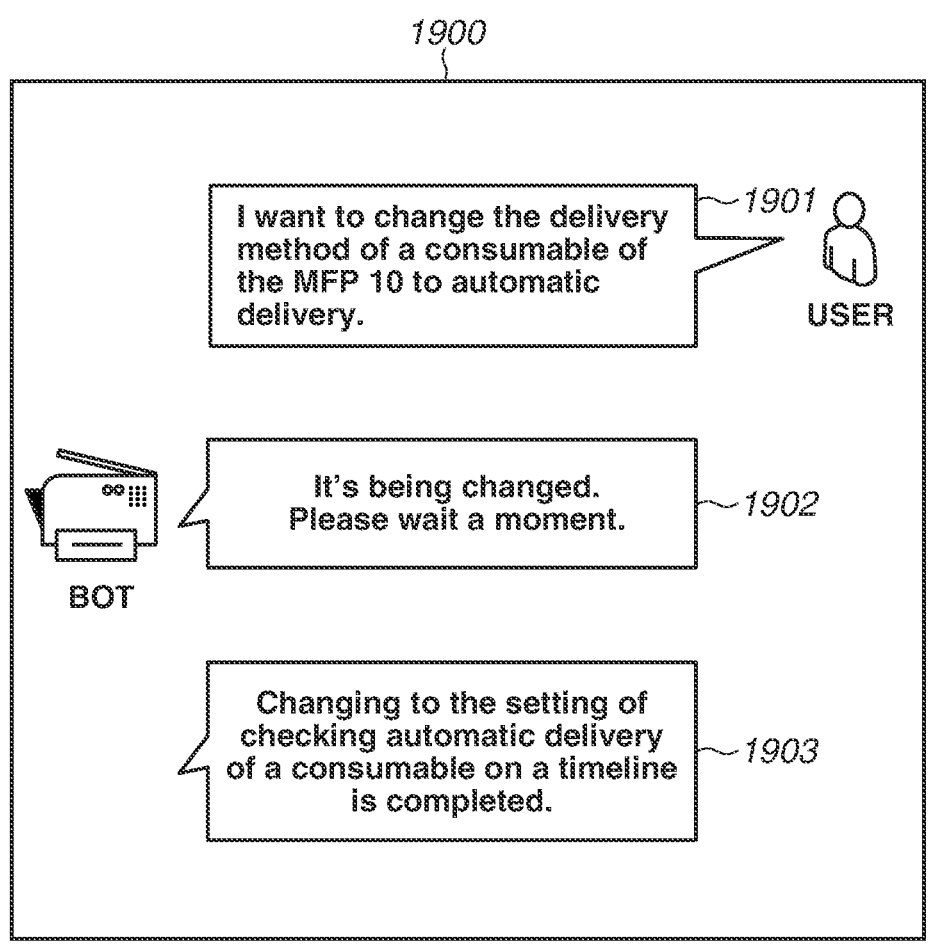
FIG. 20 is a diagram illustrating an example of a chat room screen which is displayed in changing a medium via which to perform automatic ordering for a consumable.

Moreover, FIG. 20 illustrates an example of a chat room screen 1900 which is displayed by the message application 406 when the user changes a medium which performs automatic ordering for a consumable via the chat bot application 407 to the function extension platform server 30. The chat room screen 1900 is displayed on the operation panel 501 included in the user terminal 50. The respective chats illustrated in FIG. 20 are described in parallel with the description concerning FIG. 19.

In step S1801, the user writes, with a chat format, information indicating wanting to perform automatic ordering for a consumable via the function extension platform server 30. Thus, in step S1801, the user creates a message 1901 illustrated in FIG. 20. Here, the user is making a request for causing the function extension platform server 30 to perform automatic ordering for a consumable.

Upon creation of the message 1901, in step S1802, the user terminal 50 notifies the chat bot application 407 included in the message application server 40 that the setting has been changed.

In step S1803, the chat bot application 407 included in the message application server 40 notifies the function extension platform server 30 that the parameters have been changed. At this time, the chat bot application 407 also transmits, as additional information, the MFP information 801 about the MFP 10 the setting of which has been changed.

In step S1804, the function extension platform server 30 notifies the consumable ordering server 60 that the automatic delivery setting of the MFP 10 has been updated.

In step S1805, the consumable ordering server 60 requests the MFP 10 to update the automatic delivery setting. In the case of the screen 1900, to perform such setting as to cause the function extension platform server 30 to perform automatic ordering, in step S1805, the consumable ordering server 60 requests the MFP 10 to change the setting in such a way as not to perform automatic ordering.

In step S1806, the MFP 10 updates the consumable automatic ordering setting stored in the storage 114, and transmits the updated content as a response to the consumable ordering server 60.

In step S1807, the consumable ordering server 60 notifies the function extension platform server 30 that updating of the parameters is successful.

In step S1808, the function extension platform server 30 updates the value of the ordering mode 804 associated with the MFP 10.

With the above-described configuration employed, the user is able to change the setting of the ordering mode 804 associated with the MFP 10 via the chat bot application 407.

Furthermore, while, in the present exemplary embodiment, the automatic ordering setting is written with the message 1901 in the form of a chat, the method of notification is not limited to this method. For example, a configuration in which setting items are provided in a setting screen (not illustrated) and the setting change notification in step S1802 is communicated when the user has changed the setting can be employed. Alternatively, a configuration in which "perform setting" and "do not perform setting" buttons are displayed at optional places in the chat room screen in such a way as to prompt the user to press one of the buttons can be employed. Moreover, a configuration in which information indicating that transmitting a specific message enables changing the setting is additionally written to the content of a message such as the consumable ordering checking chat 1501 and, when the user has transmitted the specific message, the setting change notification (step S1802) is communicated can be employed.

In a second exemplary embodiment of the present disclosure, a notification of an error which is issued when the MFP 10 has detected a failure or trouble, i.e., an error, and a case where the administrator executes an instruction issued by the user concerning an error coping method are described. In the second exemplary embodiment, the hardware configuration of a system is the same as that in the first exemplary embodiment and is, therefore, omitted from description, and only differences from the first exemplary embodiment are described.

Figure 21:
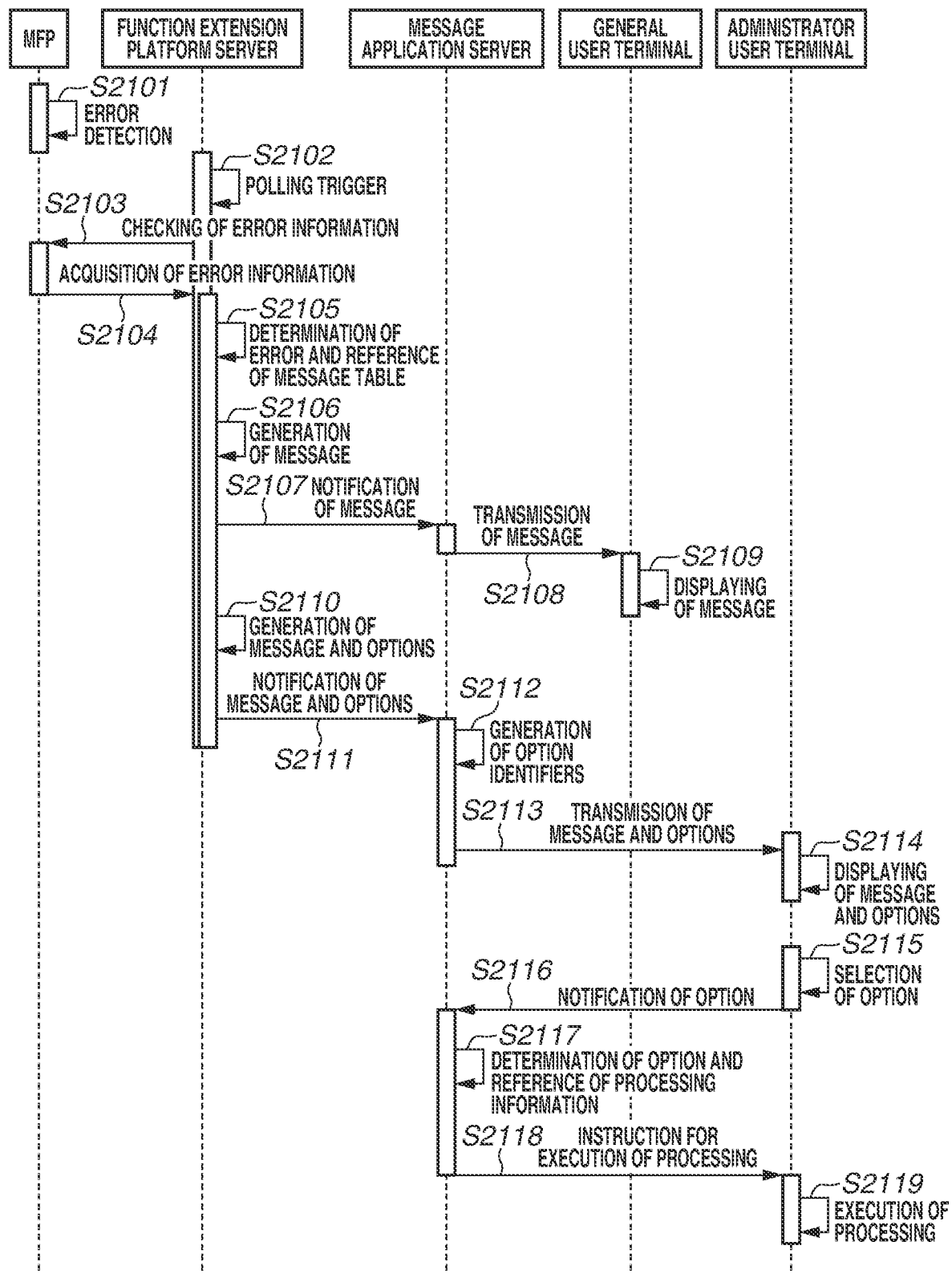
FIG. 21 is a sequence diagram illustrating a sequence which the entire system performs in a second exemplary embodiment of the present disclosure.

FIG. 21 is a diagram illustrating a sequence in the entire system in a case where a failure or trouble, i.e., an error, has occurred in the MFP 10 in the second exemplary embodiment.

first, in step S2101, the MFP 10 detects an error occurring in the MFP 10 itself. In this instance, a control program for the MFP 10 determines that an error has occurred based on a signal received from the error detection unit I/F 127 and then stores information about the error in, for example, the storage 114.

Next, in step S2102, the function extension platform server 30 detects information acquisition timing of the MFP 10. This is periodically performed with, for example, a timer as with step S1402 illustrated in FIG. 15.

In step S2103, the function extension platform server 30 makes a request for error information acquisition to the MFP 10.

In step S2104, if a record indicating that an error has newly occurred after timing of information acquisition requested last time is previously stored in the storage 114, the MFP 10 transmits such error information to the function extension platform server 30. Furthermore, while, here, the function extension platform server 30 is periodically performing acquisition of error information directly with respect to the MFP 10, the MFP 10 can be configured to, at the time of occurrence of an error, directly notify the function extension platform server 30 of the error. Moreover, a configuration in which the MFP 10 notifies the cloud printing service server 20 of an error and the function extension platform server 30 periodically acquires error information from the cloud printing service server 20 can be employed.

In step S2105, upon acquiring error information from the MFP 10, the function extension platform server 30 performs determination of the acquired error information, and refers to a message table which the function extension platform server 30 itself retains. The message table is data such as that illustrated in FIGS. 22A, 22B, and 22C, and is stored in the HDD 305 of the function extension platform server 30.

In step S2106, the function extension platform server 30 generates a message for a general user based on the acquired error information and the content of the message table. The message for a general user is mainly a message for communicating information indicating that an error has occurred. The details of a method for generating such a message are described below. Moreover, the general user is a user registered in the user information 705 of a specific channel included in the tenant information 701 illustrated in FIG. 8.

Next, in step S2107, the function extension platform server 30 notifies the message application server 40 of the generated message for a general user in such a way as to transmit such a message to a specific channel corresponding to the MFP 10 from which the error information has been acquired.

In step S2108, the message application server 40 transmits the message received in step S2107 to the designated channel. Here, processing operations of the message application server 40 in the flowchart of FIG. 21 are performed by the chat bot application 407, which is preliminarily installed on the message application server 40.

Figure 23:
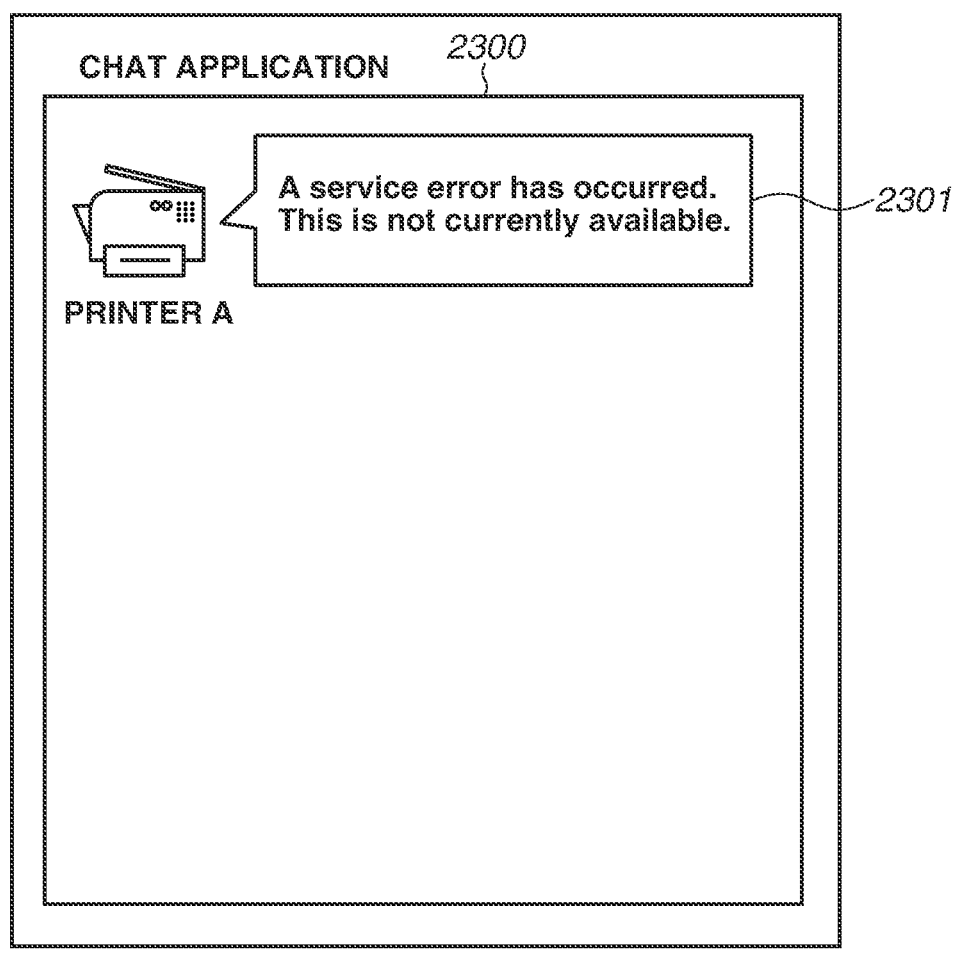
FIG. 23 is a diagram illustrating an example of a chat room screen which is displayed on a general user terminal in the second exemplary embodiment.

In step S2109, the general user terminal displays the message received from the message application server 40 on the operation panel 501. Here, FIG. 23 illustrates an example of a screen which is displayed on the user terminal at that time. The details of display content of this screen are described below.

After processing in step S2107, then in step S2110, the function extension platform server 30 generates a message and processing options for an administrator user. These options are options for selecting what processing to perform with respect to an error having occurred, and the contents of the options differ depending on errors having occurred. The function extension platform server 30 also generates the options from information included in the message table illustrated in FIGS. 22A to 22C as with the message for a general user. The details of a method of generating the options are also described below. Moreover, the administrator user is an administrator user 708 registered in the device information 707 included in the tenant information 701 illustrated in FIG. 8. The administrator user serving as a destination of transmission of the generated options is an administrator user registered in the MFP 10 in which an error has occurred.

Furthermore, a message to be generated can be changed depending on the function of the administrator user terminal. Specifically, a configuration in which, with respect to an administrator user terminal having no telephone call function, an option for processing for presenting a contact number and enabling placing a call to the contact number is not generated can be employed.

Next, in step S2111, the function extension platform server 30 transmits the generated message and option information to the message application server 40 in such a way as to post a notification on the administrator user of the MFP 10 from which error information has been acquired.

In step S2112, the message application server 40 generates option identifiers based on the message and option information received in step S2111. The option identifiers are identifiers enabling discriminating between a plurality of options. The details of the option identifiers are also described below.

Next, in step S2113, the message application server 40 transmits the message and option information including option identifiers to the administrator user terminal.

Figure 24:
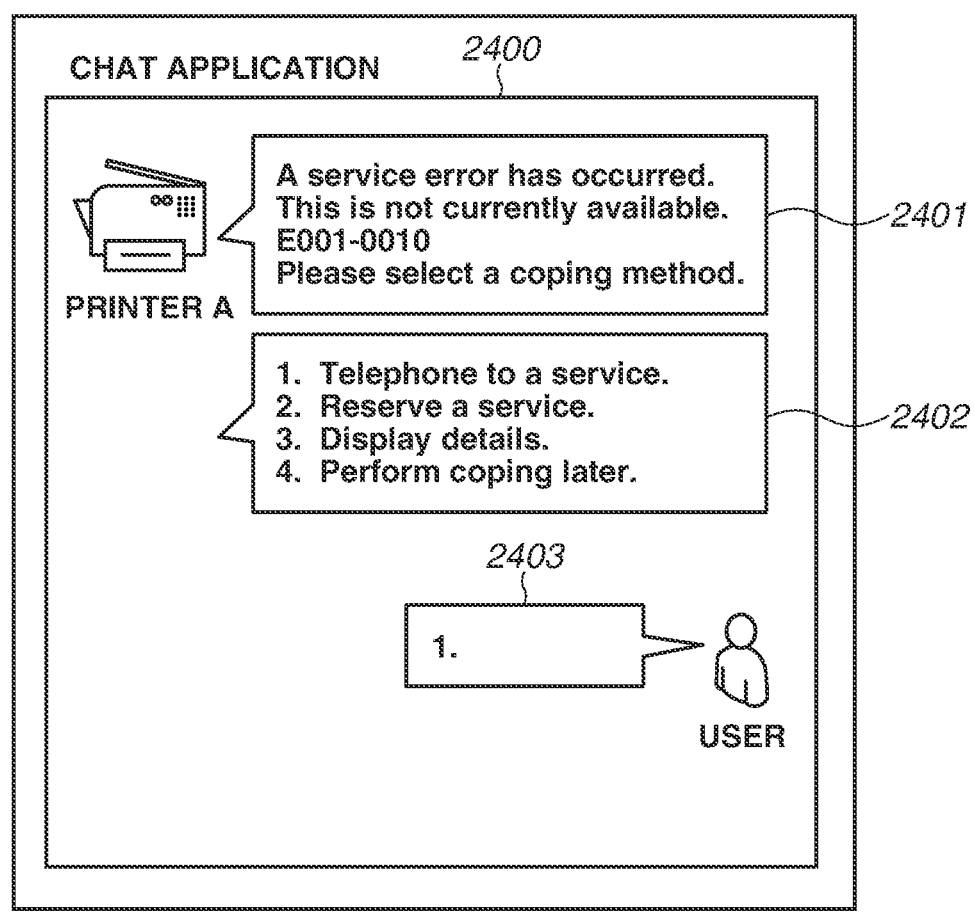
FIG. 24 is a diagram illustrating an example of a chat room screen which is displayed on an administrator user terminal in the second exemplary embodiment.

In step S2114, the administrator user terminal displays the message and option information received from the message application server 40 on the operation panel 501. Here, FIG. 24 illustrates an example of a screen which is displayed on the administrator user terminal at that time. The details of display content of this screen are described below.

Next, in step S2115, the administrator user terminal receives an instruction for selection of an option via the operation panel 501 from the user. Instead of being received as a character input, this can be received as an instruction issued by pressing one of buttons displayed as options.

After that, in step S2116, the administrator user terminal transmits information about the selected option as a response to the message application server 40.

In step S2117, upon receiving the selected option information as a response from the administrator user terminal, the message application server 40 determines whether the identifier information generated in step S2112 is included in the option information.

If determining that the identifier information is included in the option information, the message application server 40 refers to processing information corresponding to the identified option, and performs processing corresponding to the processing information.

In step S2118, in a case where the processing to be performed is processing such as execution of telephone call at the user terminal or execution of Uniform Resource Locator (URL) access, the message application server 40 transmits additional data for such execution to the administrator user terminal and instructs the administrator user terminal to perform such processing.

Figure 25:
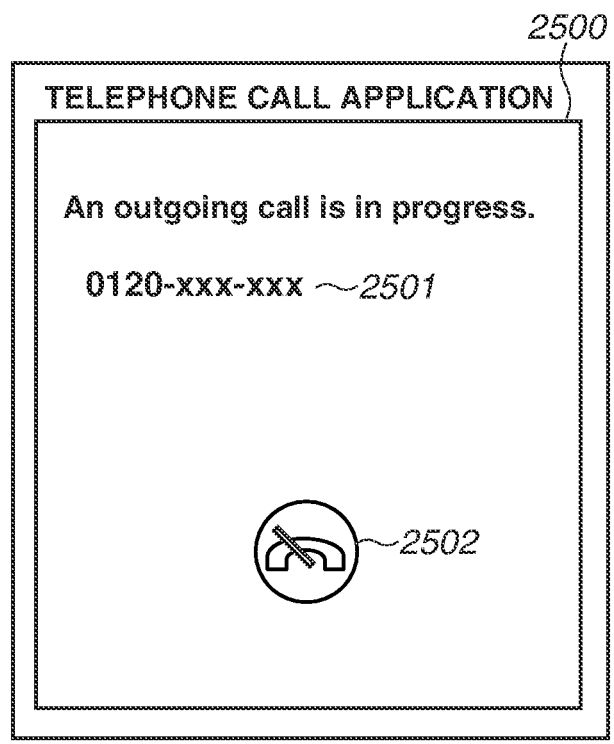
FIG. 25 is a diagram illustrating an example of a telephone call outgoing screen which is displayed on the administrator user terminal in the second exemplary embodiment.
Figure 26:
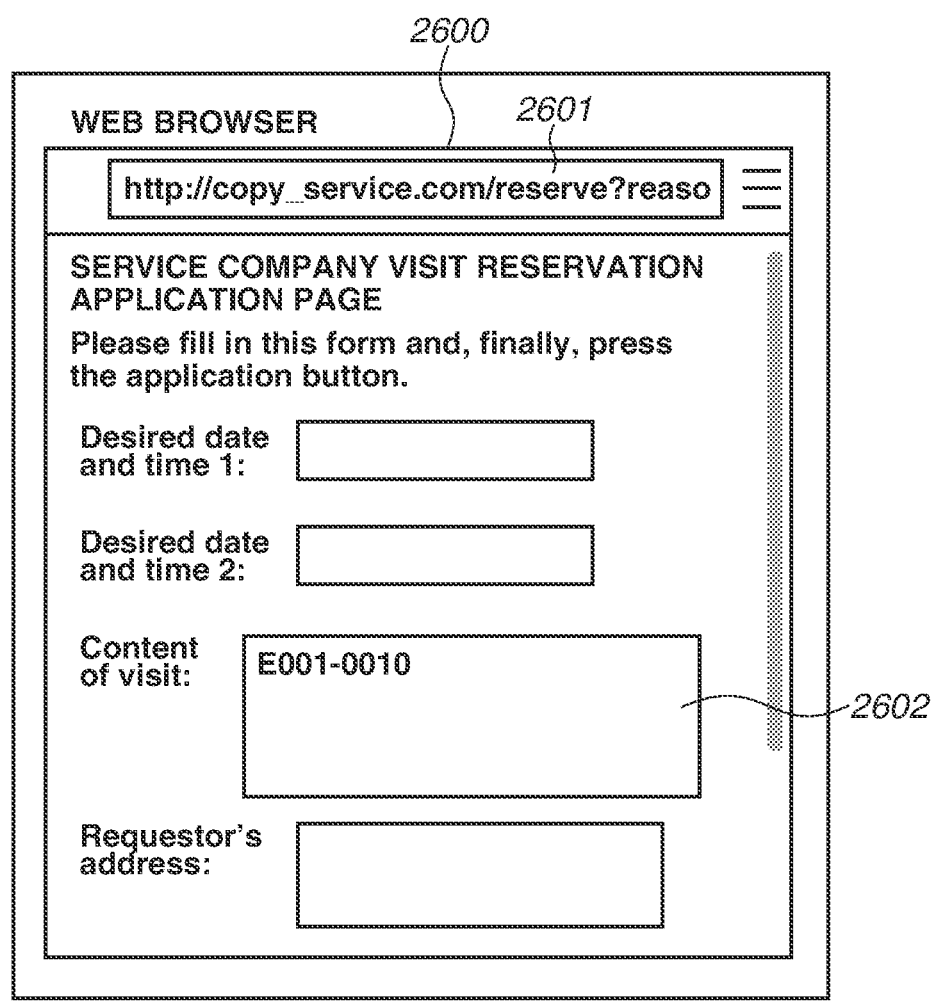
FIG. 26 is a diagram illustrating an example of a web access screen which is displayed on the administrator user terminal in the second exemplary embodiment.

In step S2119, upon receiving the processing execution instruction from the message application server 40, the administrator user terminal performs processing such as telephone call or URL access based on the received additional information such as a telephone number or URL information. Here, FIG. 25 and FIG. 26 illustrate examples of screens each of which is displayed when the processing in step S2119 has been performed by the administrator user terminal. The details of display content of such screens are described below.

In this way, in the system in the second exemplary embodiment, when the MFP 10 has detected an error, error information is displayed as a message on the user terminal, and, additionally, processing designated by an instruction from the administrator user terminal is performed.

FIGS. 22A to 22C schematically show data information included in the message table, which the function extension platform server 30 retains. These pieces of information in the message table are referred to in steps S2106 and S2110 illustrated in FIG. 21 and are used to generate a notification message and option information.

FIG. 22A illustrates a table which associates errors occurring in an MFP, notification messages, and processing options with each other. The table illustrated in FIG. 22A includes pieces of information about an error ID 2201 for identifying an error, a message ID 2202 serving as an identifier of a message associated with the error, and an option ID 2203 serving as an identifier of an option for a method of coping with the error.

FIG. 22B illustrates a table which associates message IDs, actual message sentences, and target users for displaying of messages with each other. The table illustrated in FIG. 22B includes pieces of information about a message ID 2207, a message sentence 2208 serving as a language for displaying with the message ID, and a display classification 2209 representing a target user for displaying of the message sentence.

FIG. 22C illustrates a table which associates option IDs, actual option message sentences, processing operations to be performed when respective options are selected, and pieces of additional data used for execution of processing operations with each other. The table illustrated in FIG. 22C includes pieces of information about an option ID 2216, an option sentence 2217 used for displaying the applicable option, processing 2218 indicating what processing to perform when the applicable option has been selected, and additional data 2219 used for performing the applicable processing.

Here, how the function extension platform server 30 performs message generation and option information generation in steps S2106 and S2110 illustrated in FIG. 21 based on data information shown in FIGS. 22A to 22C is specifically described. For example, in step S2105 illustrated in FIG. 21, the function extension platform server 30 is assumed to have determined that the error information acquired from the MFP 10 is equivalent to an error ID of "E001-0010".

The function extension platform server 30 searches for data corresponding to the error ID detected with the error ID 2201 from the table illustrated in FIG. 22A. Here, the function extension platform server 30 determines that the found data is equivalent to a data row 2204 corresponding to "E001-0010". Additionally, the function extension platform server 30 refers to the message ID 2202 on the data row 2204, and thus finds that message IDs "M001, M002, M003, M004" are a message to be displayed.

Next, with respect to each of these message IDs, the function extension platform server 30 searches for data with the corresponding message ID 2207 from the table illustrated in FIG. 22B. The function extension platform server 30 finds that the message ID being "M001" corresponds to a data row 2210, the message ID being "M002" corresponds to a data row 2211, the message ID being "M003" corresponds to a data row 2212, and the message ID being "M004" corresponds to a data row 2213. The function extension platform server 30 connects message sentences 2208 of the respective data rows and thus creates actual display message sentences. At this time, the function extension platform server 30 creates message sentences as a message for a general user if data in the display classification 2209 in each data row is "general", as a message for an administrator user if it is "administrator", and as a message for a genera user and an administrator user if it is "general/administrator". With this processing, a message for a general user, for which "M001" and "M002" are targeted, is generated as "A service error has occurred. This is not currently available.". Moreover, a message for an administrator user, for which "M001", "M003" and "M004" are targeted, is generated as "A service error has occurred. E001-0010 Please select a coping method.". Here, while the message sentence in "M003" is written as bracketed error ID, this means that the error ID is directly displayed as characters.

Additionally, in step S2110 illustrated in FIG. 21, the function extension platform server 30 generates option information for an error coping method for an administrator user. As with the above example, for example, the function extension platform server 30 is assumed to have determined that the acquired error information is equivalent to an error ID of "E001-0010".

The function extension platform server 30 searches for data corresponding to the error ID detected with the error ID 2201 from the table illustrated in FIG. 22A. Here, the function extension platform server 30 determines that the found data is equivalent to a data row 2204 corresponding to "E001-0010". The function extension platform server 30 refers to the option ID 2203 on the data row 2204, and thus finds that option IDs "S001, S002, S003, S004" are an option for coping with the applicable error.

Next, with respect to each of these option IDs, the function extension platform server 30 searches for data with the corresponding option ID 2216 from the table illustrated in FIG. 22C. The function extension platform server 30 finds that the option ID being "S001" corresponds to a data row 2220, the option ID being "S002" corresponds to a data row 2221, the option ID being "S003" corresponds to a data row 2222, and the option ID being "S004" corresponds to a data row 2223. The function extension platform server 30, without combining options with each other as with messages, transmits the options as respective independent pieces of information to the message application server 40.

At this time, the function extension platform server 30 associates pieces of information on each data row in the table illustrated in FIG. 22C with each other as pieces of information related to one option, and then transmits the associated information. For example, with regard to the option ID "S001", "Telephone to a service." of the option sentence 2217 on the data row 2220, "CallTelephone(#1)" of the processing 2218, and "0120-xxx-xxx" of the additional data 2219 are associated with each other as information about one option and are then transmitted. Here, in the additional data 2219, data written as bracketed error ID means that the ID of the occurred error is directly input. Thus, in a case where the option ID 2216 is "S002", "Reserve a service." of the option sentence 2217, "OpenURL(#1)" of the processing 2218, and "http://copy-_service.com/reserve?reason=E001-0010" of the additional data 2219 are generated as option information and are then transmitted. In the same way, in a case where the option ID 2216 is "S003", "Display details." of the option sentence 2217, "OpenURL(#1)" of the processing 2218, and "http://copy_service.com/error_detail?error_id=E001-0010" of the additional data 2219 are generated as option information and are then transmitted. Moreover, in a case where the option ID 2216 is "S004", "Perform coping later." of the option sentence 2217, "ChatLater(#1)" of the processing 2218, and "60 min" of the additional data 2219 are generated as option information and are then transmitted. In this way, sets of option information the number of which corresponds to the number of options are transmitted.

Here, the message table illustrated in FIGS. 22A to 22C is preliminarily stored in the function extension platform server 30 by the vendor of the system, but can be edited later by, for example, the administrator user. For example, the message sentence 2208 illustrated in FIG. 22B or the option sentence 2217 illustrated in FIG. 22C can be changed in languages. Additionally, for example, a telephone number of the outgoing call destination in the additional data 2219 illustrated in FIG. 22C can also be changed. Such editing can be implemented by the function extension platform server 30 separately providing a web application programming interface (web API) or a web page for changing data in the message table and the administrator user using the provided web API or web page.

FIG. 23 illustrates an example of a screen which is displayed on the general user terminal in step S2109 illustrated in FIG. 21.

In a chat room screen 2300, a message 2301 generated in step S2106 illustrated in FIG. 21 is displayed as a chat message for the MFP 10 with an error occurring therein. In this way, the general user becomes able to quickly receive, from the MFP 10 with an error occurring therein, information indicating that the error has occurred as a chat message.

FIG. 24 illustrates an example of a screen which is displayed on the administrator user terminal in steps S2114 and S2115 illustrated in FIG. 21.

As with the above example, in a chat room screen 2400, a message 2401 for an administrator user generated in step S2110 illustrated in FIG. 21 is displayed as a chat message for the MFP 10 with an error occurring therein. Additionally, an option message 2402 is displayed in the chat room screen 2400. The option message 2402 is configured with the above-mentioned option sentences 2217 of the option data extracted in the table illustrated in FIG. 22C arranged side by side.

However, pieces of information for identifying the respective options are appended to the option message 2402. Here, numerals "1" to "4" are appended as identifiers to the respective options. These are identifier information which the message application server 40 has appended in step S2112 illustrated in FIG. 21. Details of appending of the identifier information are described below.

Additionally, the administrator user has input, as selection of one of the displayed options, a response 2403 to the message including identification information about the selected option. While, here, a method in which options are displayed as messages having respective different identifiers and the user inputs a message as a response including an identifier is employed, a method in which buttons for respective options are displayed and the administrator presses a selected button can be employed.

FIG. 25 illustrates an example of a screen which is displayed when the administrator user terminal has received an instruction for telephone call execution processing from the message application server 40 and has performed the telephone call execution processing in step S2119 illustrated in FIG. 21. In the option message 2402 illustrated in FIG. 24, there is an option "Telephone to a service." with an identifier "1". FIG. 25 illustrates a screen which is displayed on the administrator user terminal when the administrator user transmits the identifier "1" as a response. A telephone call application screen 2500 is displayed, and an outgoing call to a telephone number 2501 of the service company is in progress. An interruption button 2502 is a button used to disconnect this outgoing call.

In this way, the administrator user transmits an identifier of the option as a response and is thus able to perform a telephone call to a previously determined destination. While this telephone call is designated by the message application server 40, the details thereof are described below.

FIG. 26 illustrates an example of a screen which is displayed when the administrator user terminal has received an instruction for URL access execution processing from the message application server 40 and has performed the URL access execution processing in step S2119 illustrated in FIG. 21. In the option message 2402 illustrated in FIG. 24, there is an option "Reserve a service." with an identifier "2". FIG. 26 illustrates a screen which is displayed on the administrator user terminal when the administrator user transmits the identifier "2" as a response. A web browser 2600 is displayed, and an access is performed to a URL 2601 of a previously determined service company visit reservation application page.

In this way, in response to the administrator user terminal transmitting an identifier of the option as a response, a previously determined URL page is displayed. Here, the administrator user terminal is able to make a reservation of visit by entering, for example, the desired date and time, the content of visit, and the requestor's address into the respective fields of the form and pressing an application button (not illustrated). Moreover, an error number of the occurred error is preliminarily input to a form field 2602 for inputting the state of a failure or trouble such as a content of visit, so that it is possible to reduce the trouble of filling in the form. While the access and displaying of this specific URL are designated by the message application server 40, the details thereof are described below.

Moreover, in the option message 2402 illustrated in FIG. 24, there is an option "Display details." with an identifier "3". When the option with an identifier "3" has been selected, as with the above-mentioned example, a web browser is displayed to display a web page in which the detailed content of the occurred error is described.

Additionally, in the option message 2402 illustrated in FIG. 24, there is an option "Perform coping later." with an identifier "4". When the option with an identifier "4" has been selected, after a previously determined elapsed time, the messages 2401 and 2402 illustrated in FIG. 24 are transmitted as chat messages. The details of these processing operations are also described below.

<Processing Operations of Function Extension Platform Server>

Figure 27:
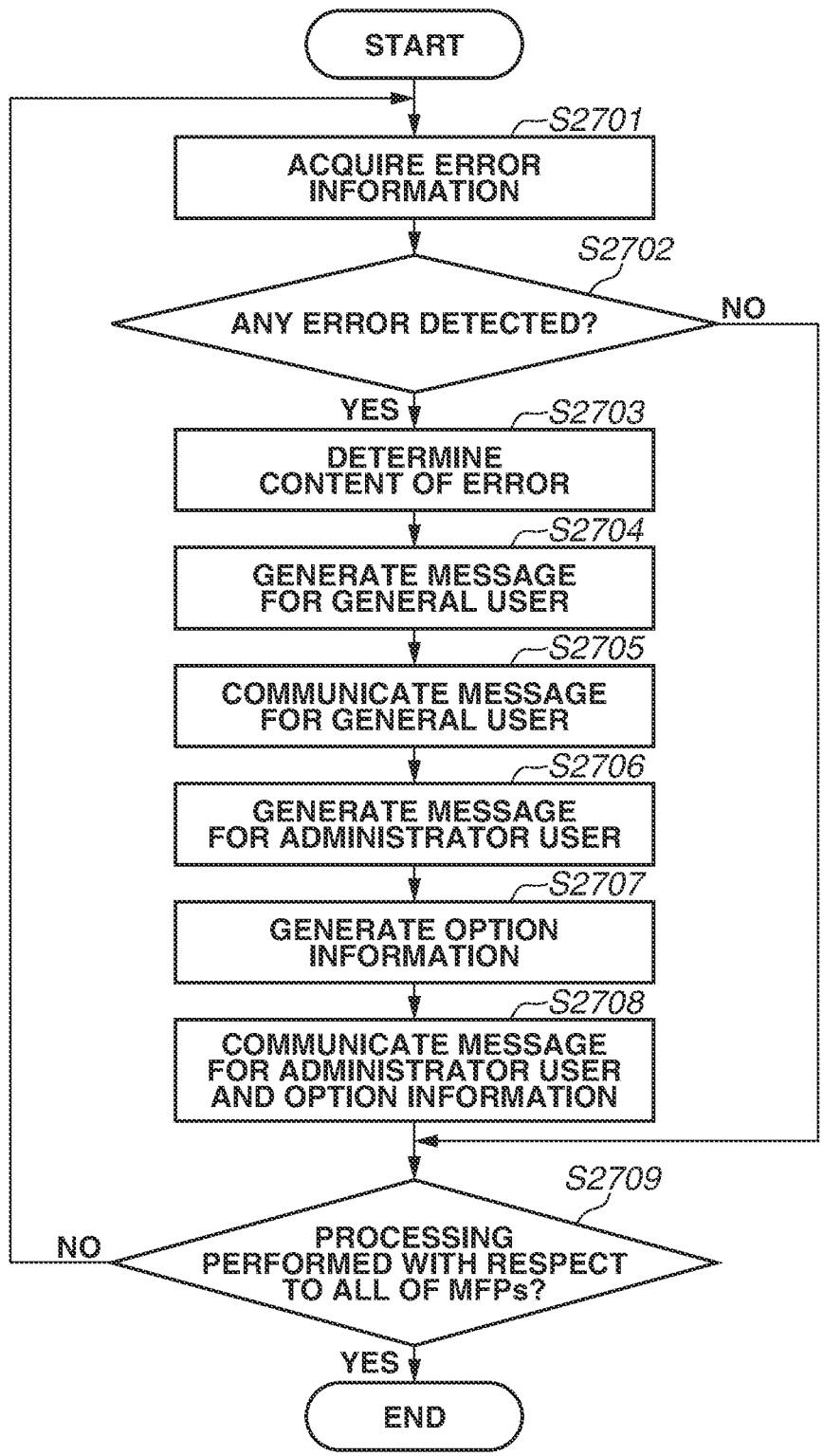
FIG. 27 is a flowchart illustrating a control operation which the function extension platform server in the second exemplary embodiment performs.

FIG. 27 is a flowchart illustrating processing which the function extension platform server 30 performs in the second exemplary embodiment. The processing illustrated in the present flowchart is periodically performed with, for example, a timer by the function extension platform server 30.

First, in step S2701, the function extension platform server 30 acquires error information from a specific MFP 10. Thus, the function extension platform server 30 requests a notification of error information from the MFP 10, and then receives error information transmitted from the MFP 10.

Next, in step S2702, the function extension platform server 30 determines whether an error occurrence is included in the received error information. If it is determined that there is no error occurrence (NO in step S2702), the function extension platform server 30 advances the processing to step S2709, and, if it is determined that an error has occurred (YES in step S2702), the function extension platform server 30 advances the processing to step S2703.

In step S2703, the function extension platform server 30 discriminates an error ID for identifying an error and thus determines the content of the error.

Next, in step S2704, the function extension platform server 30 generates a message sentence for a general user from the error ID discriminated in step S2703, the data table for error IDs illustrated in FIG. 22A, and the data table for message IDs illustrated in FIG. 22B. This is as described above in the description concerning FIGS. 22A to 22C, so that the description thereof is omitted here.

In step S2705, the function extension platform server 30 notifies the message application server 40 of the generated message for a general user in such a way as to request the message application server 40 to transmit the message for a general user to a specific channel corresponding to the MFP 10 from which the error information has been acquired.

In step S2706, the function extension platform server 30 generates a message sentence for an administrator user from the discriminated error ID, the data table for error IDs illustrated in FIG. 22A, and the data table for message IDs illustrated in FIG. 22B. This is also as described above in the description concerning FIGS. 22A to 22C, so that the description thereof is omitted here.

Next, in step S2707, the function extension platform server 30 generates option information from the discriminated error ID, the data table for error IDs illustrated in FIG. 22A, and the data table for option IDs illustrated in FIG. 22C. Generation of the option information is as described above in the description concerning FIGS. 22A to 22C, so that the description thereof is omitted here.

In step S2708, the function extension platform server 30 transmits the message sentence generated in step S2706 and the option information generated in step S2707 to the administrator user terminal.

Additionally, in step S2709, the function extension platform server 30 determines whether the processing operations in steps S2701 to S2708 have been performed with respect to all of the MFPs. If it is determined that the processing operations have not yet been performed with respect to all of the MFPs (NO in step S2709), the function extension platform server 30 returns the processing to step S2701 and then performs processing operations starting with step S2701 with respect to any MFP for which the processing operations have not yet been performed. If it is determined that the processing operations have been performed with respect to all of the MFPs (YES in step S2709), the function extension platform server 30 ends a series of processing operations.

<Processing Operations of Message Application Server>

Figure 28:
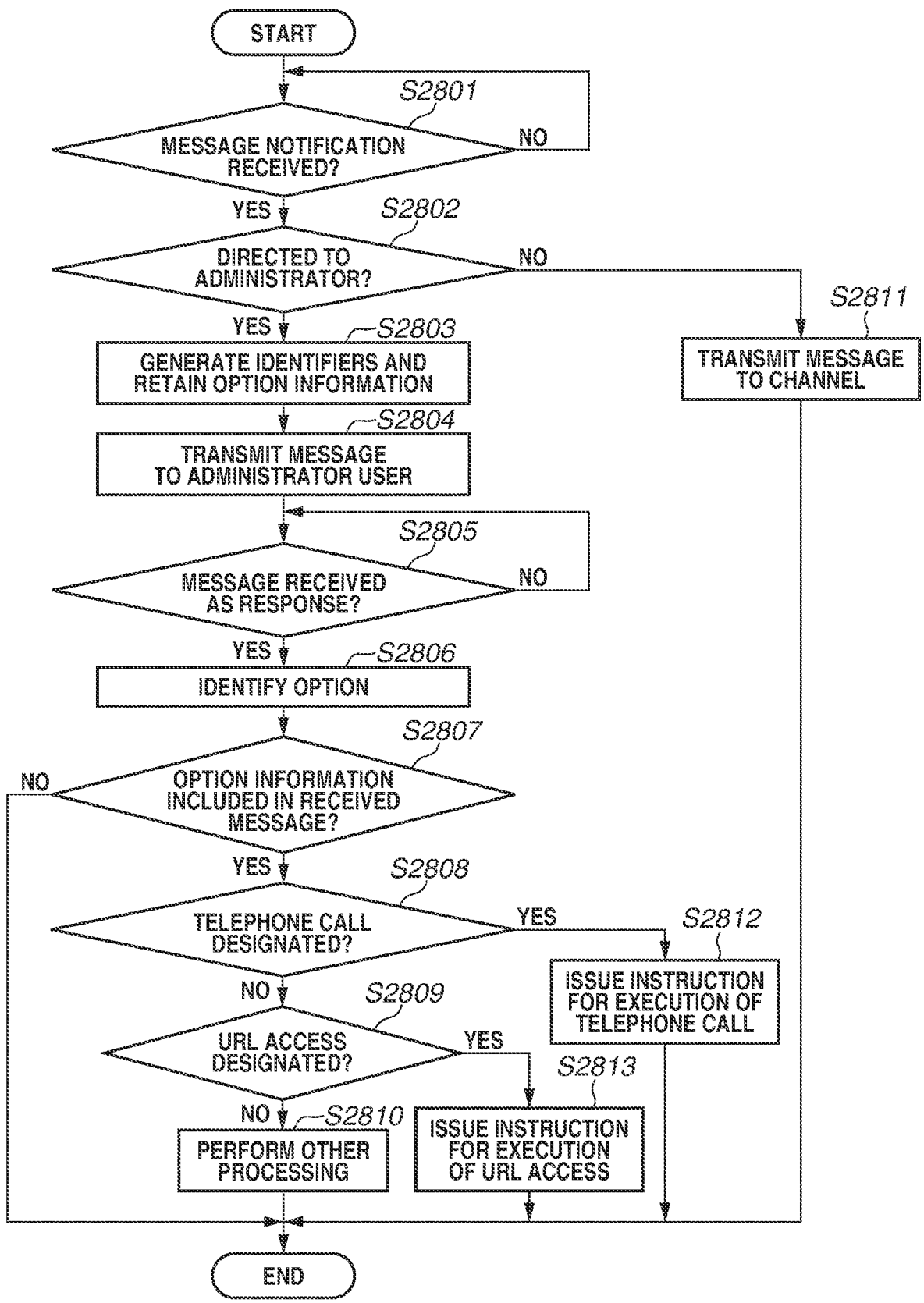
FIG. 28 is a flowchart illustrating a control operation which a chat bot application in the second exemplary embodiment performs.

FIG. 28 is a flowchart illustrating processing which the message application server 40 performs in the second exemplary embodiment. Actually, the chat bot application 407 included in the message application server 40 performs this processing.

First, in step S2801, the chat bot application 407 determines whether a message notification has been received from the function extension platform server 30. If it is determined that no message notification has been received (NO in step S2801), the chat bot application 407 returns the processing to step S2801, thus repeating the determination of reception of a message notification. If it is determined that a message notification has been received (YES in step S2801), the chat bot application 407 advances the processing to step S2802.

In step S2802, the chat bot application 407 determines whether the message notification is the one directed to an administrator. This is to determine whether the received message is the one directed to an administrator user or directed to a general user, and, if option information has also been received simultaneously, it is determinable that the received message is the one directed to an administrator user and, if option information is not included in the message notification, it is determinable that the received message is the one directed to a general user. In this case, it is premised that option information is necessarily included in the message directed to an administrator user. However, in a case where option information is not included even in the message directed to an administrator user, the function extension platform server 30 can be caused to transmit a message configured to include identification information indicating whether the message is the one directed to an administrator user or directed to a general user, and the chat bot application 407 can perform the determination based on the identification information. If it is determined that the message notification is not the one directed to an administrator (NO in step S2802), the chat bot application 407 advances the processing to step S2811. Moreover, if it is determined that the message notification is the one directed to an administrator (YES in step S2802), the chat bot application 407 advances the processing to step S2803.

In step S2803, the chat bot application 407 performs generation of identifiers and retention of option information. The identifiers are to be displayed while being appended to the received option messages, and are used to uniquely identify the respective options. In the case of the example illustrated in FIG. 24, numerals "1. 2. 3. 4." are generated as option identifiers. In addition, the identifiers can be alphabets such as "A. B. C. D." or special symbols able to be displayed by the user terminal as long as they are capable of uniquely identifying the respective options.

Additionally, the chat bot application 407 stores the option information including the generated option identifiers in, for example, the HDD 405 of the message application server 40. This is to refer to the option information so as to discriminate information about an option selected by the user.

Next, in step S2804, the chat bot application 407 transmits a message to the administrator user terminal. Here, the message to be transmitted is a message in which the option information generated in step S2803 is appended to the respective option message sentences as in the example illustrated in FIG. 24.

After that, in step S2805, the chat bot application 407 determines whether a message has been received as a response from the user terminal to which the message has been transmitted. If it is determined that no message has been received as a response from the user terminal (NO in step S2805), the chat bot application 407 returns the processing to step S2805, thus repeating the determination of reception of a message. On the other hand, if it is determined that a message has been received as a response from the user terminal (YES in step S2805), the chat bot application 407 advances the processing to step S2806.

In step S2806, the chat bot application 407 determines whether option information is included in the received message. This is to identify which identifier information about the options generated in step S2803 is included in the received message. For example, in the case of the example illustrated in FIG. 24, since numerals such as "1. 2. 3. 4." are generated as identifiers, the chat bot application 407 determines which option has been selected based on whether a numeral such as "1." is included in the received message. Moreover, the chat bot application 407 can determine which option has been selected based on whether characters capable of making an option uniquely recognizable in the option message for respective options are included in the received message. For example, in the case of the option message illustrated in FIG. 24, since words such as "telephone", "reserve", "details" and "later" do not overlap with other option messages, in a case where any one of these words is included in the received message, it becomes possible to uniquely determine an option. Additionally, even in a case where a synonym or similar word of the word capable of making an option uniquely recognizable in the option message is included in the received message, the chat bot application 407 can determine that the option has been selected. For example, if a word such as "telephone" is used as identification information, in a case where a word such as "phone", "TEL", or "call" is included in the received message, the chat bot application 407 can determine that the same option as "telephone" has been selected.

Next, in step S2807, the chat bot application 407 determines, by the processing in step S2806, whether option information has been included in the received message. If it is determined that option information has not been included in the received message and, therefore, identifier information has not been determined (NO in step S2807), the chat bot application 407 ends a series of these processing operations. If it is determined that option information has been included in the received message (YES in step S2807), the chat bot application 407 advances the processing to step S2808.

In step S2808, the chat bot application 407 determines whether the identifier of the option information is the one designating a telephone call. This is to refer to the option information stored in step S2803 and then determine whether processing included in option information equivalent to the identifier received as a message is processing for causing a telephone call to be performed. In the case of the example illustrated in FIG. 22C, the chat bot application 407 determines whether the processing 2218 is processing for performing a telephone call included in the message application server 40 such as "CallTelephone(#1)". If it is determined that the processing included in option information is not processing for causing a telephone call to be performed (NO in step S2808), the chat bot application 407 advances the processing to step S2809. On the other hand, if it is determined that the processing included in option information is processing for causing a telephone call to be performed (YES in step S2808), the chat bot application 407 advances the processing to step S2812.

In step S2812, the chat bot application 407 instructs the user terminal to perform execution of a telephone call. Processing "CallTelephone(#1)" is an API for causing a telephone call to be performed to a telephone number designated by a specific user terminal in the message application server 40. "#1" is an argument of the API, and, by this argument, the additional data 2219 illustrated in FIG. 22C is passed. The additional data in this case is a telephone number, and the telephone number of a service company for the MFP is preliminarily stored. The message application server 40 instructs the user terminal to perform a telephone call to the telephone number. This is implemented by preliminarily preparing an I/F such as a web API for performing a telephone call to a telephone number designated on the user terminal side and calling up the I/F. Alternatively, a method of preliminarily installing an application for performing a telephone call in response to a request from the outside on the user terminal and instructing the installed application to perform a telephone call with the telephone number information can be employed. With this processing, in the administrator user terminal, a telephone call to a previously registered service company is performed. After that, the chat bot application 407 ends a series of processing operations.

In processing in step S2812, for execution of a telephone call, an I/F such as a web API prepared on the user terminal side is used. Therefore, in a case where the user terminal is a terminal which does not include a telephone call function itself or is a terminal for which an OF for performing a telephone call is not prepared, or in a case where an error has occurred in calling up, for example, a web API, it is impossible to perform processing for a telephone call. In such a case, the message application server 40 transmits, to the user terminal, information indicating that the processing for a telephone call has not been able to be performed as a chat message.

If, in step S2808, it is determined that the processing included in option information is not processing for causing a telephone call to be performed (NO in step S2808), the chat bot application 407 advances the processing to step S2809.

In step S2809, the chat bot application 407 determines whether the received identifier is the one designating URL access. This is to refer to the option information stored in step S2803 and then determine whether processing included in option information equivalent to the identifier received as a message is processing for causing URL access to be performed. In the case of the example illustrated in FIG. 22C, the chat bot application 407 determines whether the processing 2218 is processing for performing URL access included in the message application server 40 such as "OpenURL(#1)". If it is determined that the processing included in option information is not processing for causing URL access to be performed (NO in step S2809), the chat bot application 407 advances the processing to step S2810.

If, in step S2809, it is determined that the processing included in option information is processing for causing URL access to be performed (YES in step S2809), the chat bot application 407 advances the processing to step S2813.

In step S2813, the chat bot application 407 instructs the user terminal to perform execution of URL access. Processing "OpenURL(#1)" is an API for causing URL access to be performed to a URL designated by a specific user terminal in the message application server 40. "#1" is an argument of the API, and, by this argument, the additional data 2219 illustrated in FIG. 22C is passed. The additional data in this case is a URL address, and the URL of a visit reservation site of a service company for the MFP or a web page in which the detailed information about an occurred error is described is preliminarily stored. For example, in the additional data 2221 illustrated in FIG. 22C, an error ID "E001-0010" is configured to be able to be designated by a query parameter as in the form of "http://copy_service.com/reserve?reason=E001-0010", so that it is possible to input its value to, for example, some form fields of the reservation site. Moreover, in the additional data 2222 illustrated in FIG. 22C, likewise an error ID is designated by a query parameter in the form of "http://copy_service.com/error_detail?error_id=E001-0010", it is possible to specify and display a web page concerning an occurred error. The message application server 40 instructs the user terminal to perform URL access to such a URL address. This is implemented by, as mentioned above, preliminarily preparing an OF such as a web API on the user terminal side and calling up the I/F. Alternatively, a method of preliminarily installing an application for performing URL access in response to a request from the outside on the user terminal and instructing the installed application to perform URL access with the URL address can be employed. With this processing, in the administrator user terminal, a visit reservation site of a previously registered service company is able to be displayed. After that, the chat bot application 407 ends a series of processing operations.

If it is determined that the processing included in option information is not processing for causing URL access to be performed (NO in step S2809), the chat bot application 407 advances the processing to step S2810.

In step S2810, the chat bot application 407 performs processing included in option information equivalent to the received identifier. This processing includes processing for, to perform processing for coping with the occurred error later, retransmitting a message concerning the occurrence of an error after a predetermined time. In the case of the example illustrated in FIG. 22C, if the processing 2218 is processing "ChatLater(#1)", the message application server 40 retransmits the message and option information transmitted to the user terminal in step S2804 to the same user terminal. At this time, concerning at how much interval to perform transmission, the message application server 40 refers to information included in the additional data 2219. In the case of an example of additional data on the data row 2223 illustrated in FIG. 22C, "60 min" is shown, so that the message application server 40 retransmits a chat message after one hour. In this way, not only does the message application server 40 cause the user terminal to perform some processing, but also the message application server 40 is able to perform some processing solely. After that, the chat bot application 407 ends a series of processing operations. Moreover, if it is determined that the received message is not the one directed to an administrator user (NO in step S2802), the chat bot application 407 determines that the received message is the one directed to a general user and thus advances the processing to step S2811.

In step S2811, the chat bot application 407 performs processing for transmitting the received message to a specific channel. After that, the chat bot application 407 ends a series of processing operations.

In this way, in the second exemplary embodiment, when the MFP 10 detects an error, information concerning the occurred error is displayed as a chat message on the user terminal. Moreover, on the administrator user terminal, methods for coping with the occurred error are displayed as options, so that, in response to a selected option being transmitted as a response, the corresponding processing is automatically performed. With this, with respect to the occurrence of an error in the MFP 10, it is possible to quickly perform processing for coping with the error, thus enabling reducing a burden which has ever been put on the user with an error coping processing operation.

The present disclosure can also be implemented by performing processing for supplying a program for implementing one or more functions of the above-described exemplary embodiments to a system or apparatus via a network or a storage medium and causing one or more processors in a computer of the system or apparatus to read out and execute the program. Moreover, the present disclosure can also be implemented by a circuit which implements such one or more functions (for example, an application specific integrated circuit (ASIC)).

According to aspects of the present disclosure, in an automatic ordering system, it is possible to perform ordering of a consumable at appropriate timing which the user needs. Moreover, it becomes possible to decrease the number of processes which the user needs in an ordering checking operation as compared with a conventional method. Moreover, with respect to the occurrence of a failure or trouble in an image forming apparatus, it becomes possible to reduce complicated processing for coping with the failure or trouble.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-062382 filed Apr. 4, 2022, which is hereby incorporated by reference herein in its entirety.

What is claimed is:

1. An information processing apparatus connected to an image forming apparatus and a server system providing a message communication service via a network, the information processing apparatus comprising:
   one or more memories configured to store options corresponding to error information of an error occurred at the image forming apparatus and information corresponding to operations; and
   a communication interface configured to:
      receive the error information from the image forming apparatus;
      transmit a message based on the received error information to a user of the message communication service without transmitting the stored options based on the received error information to the message communication service wherein the user corresponds to a general user of the image forming apparatus; and
      transmit a message based on the received error information, the stored options based on the received error information, and the information corresponding to the operations to a user of the message communication service, wherein the user corresponds to an administrator user of the image forming apparatus,
      wherein the message communication service transmits an instruction, based on the information corresponding to an operation process corresponding to an option selected by the administrator user from the transmitted options, for causing a terminal to execute the operation.

2. The information processing apparatus according to claim 1, wherein the operation corresponding to the stored options includes a call by telephone and a notification using a website.

3. The information processing apparatus according to claim 2, wherein the communication interface transmits only options which the terminal for the administrator user is able to execute.

4. The information processing apparatus according to claim 1, wherein the message transmitted to the user corresponding to the general user is posted to a chat room corresponding to the user corresponding to the general user, and the message and the stored options transmitted to the user corresponding to the administrator user are posted to a chat room corresponding to the user corresponding to the administrator user.

5. The information processing apparatus according to claim 4, wherein the chat room corresponding to the administrator user is displayed by the terminal.

6. A control method for an information processing apparatus that has one or more memories storing options corresponding to error information of an error occurred at an image forming apparatus and information corresponding to operations and that is connected to the image forming apparatus and a message communication service via a network, the control method comprising:
- receiving the error information from the image forming apparatus;
- transmitting a message based on the received error information to a user of the message communication service without transmitting the stored options based on the received error information to the message communication service, wherein the user corresponds to a general user of the image forming apparatus; and
- transmitting a message based on the received error information, the stored options based on the received error information, and the information corresponding to the operations to a user of the message communication service, wherein the user corresponds to an administrator user of the image forming apparatus,
- wherein the message communication service transmits an instruction, based on the information corresponding to an operations corresponding to an option selected by the administrator user from the transmitted options, for causing a terminal to execute the operation.

7. The control method according to claim 6, wherein the operation corresponding to the stored options includes a call by telephone and a notification using a website.

8. The control method according to claim 7, wherein only options which the terminal for the administrator user is able to execute are transmitted.

9. The control method according to claim 6, wherein the message transmitted to the user corresponding to the general user is posted to a chat room corresponding to the user corresponding to the general user, and the message and the stored options transmitted to the user corresponding to the administrator user are posted to a chat room corresponding to the user corresponding to the administrator user.

10. The control method according to claim 9, wherein the chat room corresponding to the administrator user is displayed by the terminal.

11. A non-transitory computer-readable storage medium storing executable instructions that, when executed by one or more processors of a computer of an information processing apparatus that has one or more memories storing options corresponding to error information of an error occurred at an image forming apparatus and information corresponding to operations, and that is connected to the image forming apparatus and a message communication service via a network, causes the information processing apparatus to perform operations comprising:
- receiving the error information from the image forming apparatus;
- transmitting a message based on the received error information a user of to the message communication service without transmitting the stored options based on the received error information to the message communication service, the wherein the user corresponds to a general user of the image forming appparatus; and
- transmitting a message based on the received error information, the stored options based on the received error information, and the information corresponding to the operations to a user of the message communication service, wherein the chat room is provided by the message communication service,
- wherein the message communication service transmits an instruction, based on the information corresponding to an operation corresponding to an option selected by the administrator user from the transmitted options, for causing a terminal to execute the operation.

12. The non-transitory computer-readable storage medium according to claim 11, wherein the operation corresponding to the stored options include a call by telephone and a notification using a website.

13. The non-transitory computer-readable storage medium according to claim 12, wherein only options which the terminal for the administrator user is able to execute are transmitted.

14. The non-transitory computer-readable storage medium according to claim 11, wherein the message transmitted to the user corresponding to the general user is posted to a chat room corresponding to the user corresponding to the general user, and the message and the stored options transmitted to the user corresponding to the administrator user are posted to a chat room corresponding to the user corresponding to the administrator user.

15. The non-transitory computer-readable storage medium according to claim 14, wherein the chat room corresponding to the administrator user is displayed by the terminal.

* * * * *